United States Patent [19]
Herbig et al.

[11] Patent Number: 5,745,675
[45] Date of Patent: Apr. 28, 1998

US005745675A

[54] OBJECT ORIENTED FRAMEWORK MECHANISM FOR PERFORMING COMPUTER SYSTEM DIAGNOSTICS

[75] Inventors: Kyle David Herbig, Lafayette, Colo.; Mark Ambrose McKelvey; Thomas Joseph Warne, both of Rochester, Minn.

[73] Assignee: International Business Machines Corporation, Armonk, N.Y.

[21] Appl. No.: 636,292

[22] Filed: Apr. 23, 1996

[51] Int. Cl.⁶ .................................................. G06F 11/263
[52] U.S. Cl. .......................... 395/183.14; 395/183.22
[58] Field of Search ...................... 395/183.14, 183.01, 395/183.22, 614, 62

[56] References Cited

U.S. PATENT DOCUMENTS

| | | | |
|---|---|---|---|
| 5,081,598 | 1/1992 | Bellows et al. | 364/550 |
| 5,291,593 | 3/1994 | Abraham et al. | 395/614 |
| 5,295,256 | 3/1994 | Bapat | 395/500 |
| 5,313,630 | 5/1994 | Namioka et al. | 395/614 |
| 5,337,262 | 8/1994 | Luthi et al. | 364/580 |
| 5,341,478 | 8/1994 | Travis, Jr. et al. | 395/200.03 |
| 5,390,325 | 2/1995 | Miller | 395/183.14 |
| 5,414,812 | 5/1995 | Filip et al. | 395/614 |
| 5,421,004 | 5/1995 | Carpenter et al. | 395/183.01 |
| 5,438,673 | 8/1995 | Court et al. | 396/500 |
| 5,453,933 | 9/1995 | Wright et al. | 364/474.23 |
| 5,499,365 | 3/1996 | Anderson et al. | 395/619 |
| 5,504,892 | 4/1996 | Atsott et al. | 395/614 |
| 5,564,048 | 10/1996 | Eick et al. | 395/614 |
| 5,602,990 | 2/1997 | Leete | 395/183.22 |
| 5,606,661 | 2/1997 | Wear et al. | 395/183.14 |

*Primary Examiner*—Robert W. Beausoliel, Jr.
*Assistant Examiner*—Scott T. Baderman
*Attorney, Agent, or Firm*—Schmeiser, Olsen & Watts

[57] ABSTRACT

An object oriented framework for diagnostic testing operates upon a user-defined diagnostic script to perform the desired tests. Certain core functions are provided by the framework, which interact with extensible functions. This separation of core and extensible functions allows the separation of the diagnostic application from the attributes of the test. A user may thus define extensible functions that allow the framework to test specific hardware and/or software without the framework having the knowledge of the specific tests being performed, or the results of those tests.

72 Claims, 35 Drawing Sheets

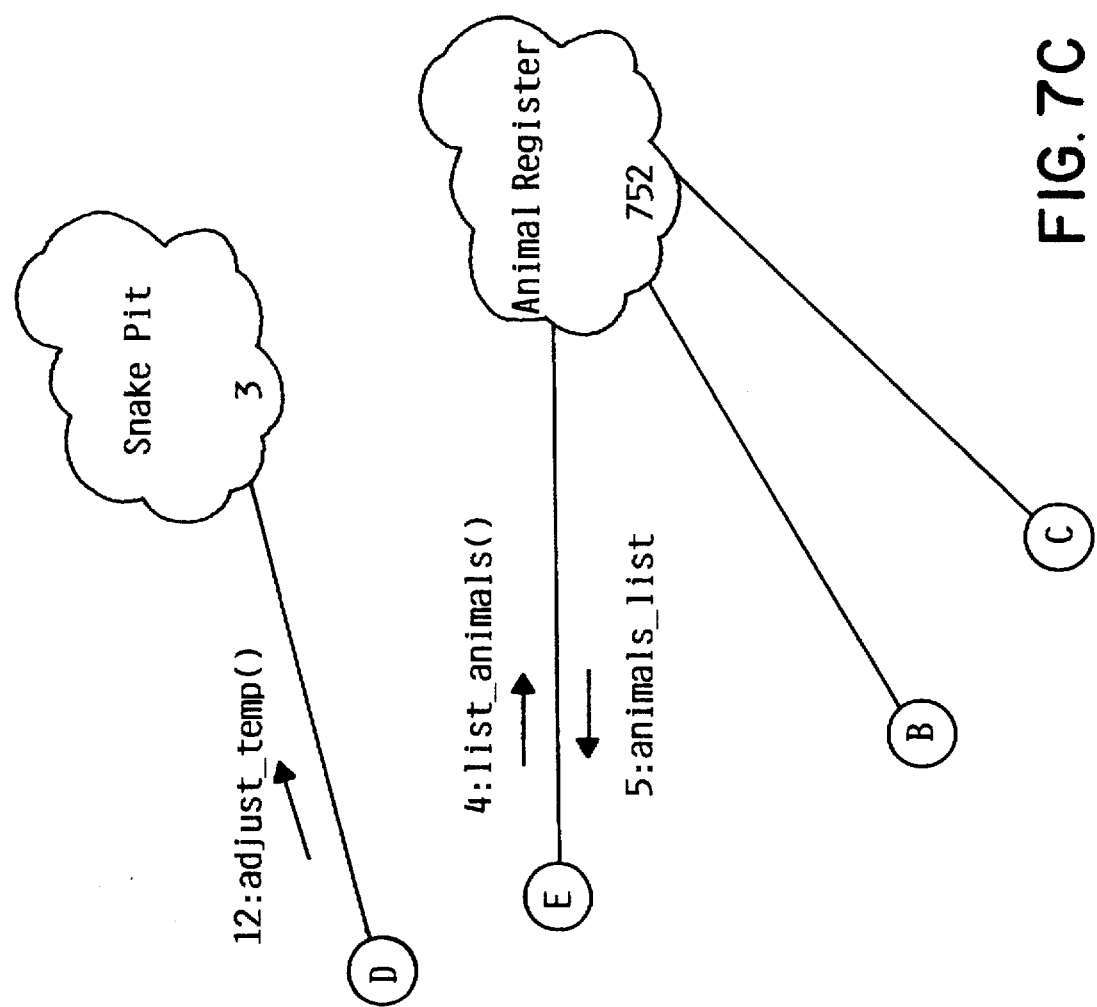

OBJECT ORIENTED FRAMEWORK MECHANISM FOR PERFORMING COMPUTER SYSTEM DIAGNOSTICS

FIELD OF THE INVENTION

The present invention relates in general to the data processing field. More specifically, the present invention relates to the field of Object Oriented framework mechanisms.

BACKGROUND OF THE INVENTION

The development of the EDVAC computer system of 1948 is often cited as the beginning of the computer era. Since that time, computer systems have evolved into extremely sophisticated devices. Modern computer systems contain relatively complex software that the computer hardware executes in order for the computer system to perform its intended functions. As the complexity of computer hardware and software increases, the need to test these increasingly complex systems becomes more and more critical.

In the past, testing computer hardware or software required that a programmer write special-purpose test code that would perform the desired testing. For example, when a manufacturer came out with a new design for a floppy disk drive, a programmer would have to generate special test code that would perform the desired diagnostics on the disk drive hardware and software to assure the disk drive is functioning properly. This test code was typically special-purpose code, generated for a particular platform which is intended to perform diagnostics on a particular subsystem (such as the disk drive referenced above). As the diagnostic requirements changed, the programmer would generally write new code for each new requirement, and delete the code that pertained to diagnostics that were no longer needed. An example of diagnostic code development may be illustrated by a simple example. When a new design of a disk drive is initially conceived of, the various subsystems within the disk drive may be developed separately, with each one being individually tested before integrating the various subsystems into a functioning system. The programmer would generate diagnostic code that will provide the required diagnostics on each subsystem. Once the entire disk drive was designed, the programmer would provide a fully integrated diagnostic system to test the disk drive software and hardware. The testing of the drive in this stage is for the purpose of design verification, and the diagnostic software will thus perform exhaustive diagnostics on all portions of the disk drive, including extensive hardware and software diagnostics, to assure the integrity of the design. Once the design is verified, as the disk drive goes into production, the diagnostic software must evolve again to accommodate the more time-sensitive and less exhaustive diagnostics required in production screening and testing. The programmer must then pare down the test code to perform the less exhaustive tests for production testing.

The process of generating diagnostic code has been burdensome. Generally the programmer starts from scratch, defining a custom diagnostic application to match the specific requirements of the product to be tested and the platform running the diagnostic code. As changes are required, the programmer makes changes to the diagnostic application to accommodate those changes. When the project concludes, the diagnostic software generally cannot be reused on a new design, since the specific interface and test requirements are generally different enough to preclude porting the diagnostic code to new applications. As a result, diagnostic code to date has generally not been readily customizable and easily extendable to testing new systems.

As the complexity of computer hardware and software increases, the need for better mechanisms for diagnostic testing becomes more apparent and more acute. Without a mechanism that can be readily customized and extended to satisfy new diagnostic requirements, the ability to adequately test computer systems in a cost-effective manner will be impaired.

SUMMARY OF THE INVENTION

As discussed in the Background section, there is serious need in the industry for user-extensible diagnostic systems. According to the present invention, an object oriented framework for diagnostic testing operates upon a user-defined diagnostic script to perform the desired tests. Certain core functions are provided by the framework, which interact with extensible functions. This separation of core and extensible functions allows the separation of the diagnostic application from the attributes of the test. A user may thus define extensible functions that allow the framework to test specific hardware and/or software without the framework having the knowledge of the specific tests being performed, or the results of those tests.

The framework mechanism of the present invention was designed and constructed using object-oriented technology. Those who are unfamiliar with object-oriented technology, or with object-oriented framework mechanisms, should read the object-oriented overview section of the Description of the Preferred Embodiments section.

DESCRIPTION OF THE PREFERRED EMBODIMENTS

Overview—Object-Oriented Technology

Figure 1:
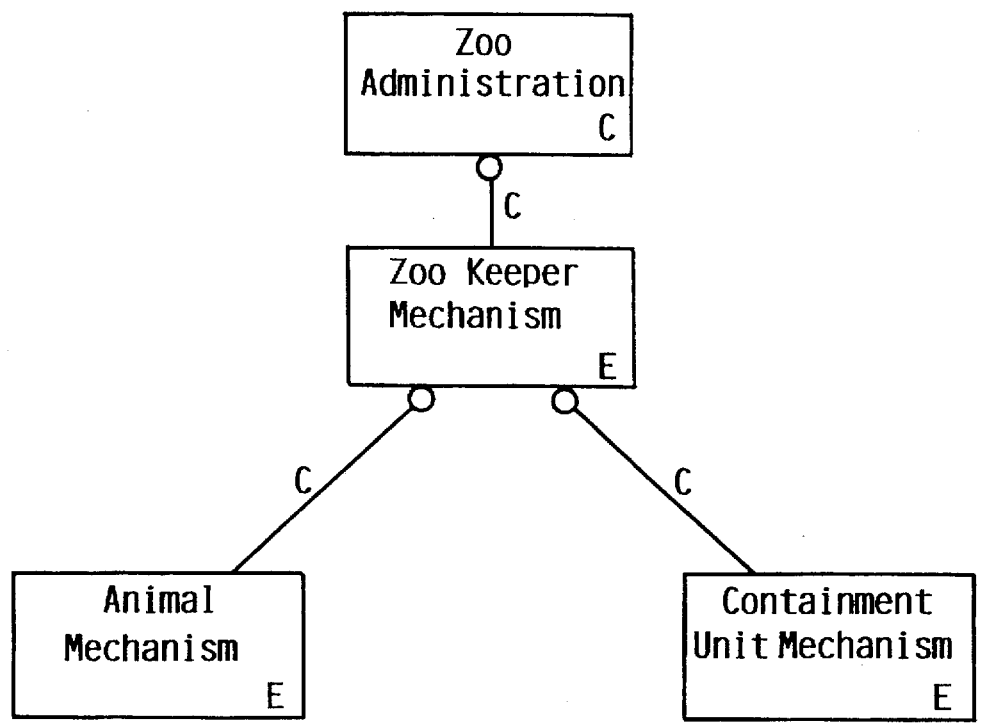
FIG. 1 is a category diagram of an example framework mechanism.

As discussed in the Summary section, the present invention was developed using Object-oriented (OO) framework technology. Individuals skilled in the art of OO framework technology may wish to proceed to the Detailed Description section of this specification. However, those individuals who are new to framework technology, or new to OO technology in general, should read this overview section in order to best understand the benefits and advantages of the present invention.

Object-Oriented Technology v. Procedural Technology

Though the present invention relates to a particular OO technology (i.e., OO framework technology), the reader must first understand that, in general, OO technology is significantly different than conventional, process-based technology (often called procedural technology). While both technologies can be used to solve the same problem, the ultimate solutions to the problem are always quite different. This difference stems from the fact that the design focus of procedural technology is wholly different than that of OO technology. The focus of process-based design is on the overall process that solves the problem; whereas, the focus of OO design is on how the problem can be broken down into a set of autonomous entities that can work together to provide a solution. The autonomous entities of OO technology are called objects. Said another way, OO technology is significantly different from procedural technology because problems are broken down into sets of cooperating objects instead of into hierarchies of nested computer programs or procedures.

The Term Framework

There has been an evolution of terms and phrases which have particular meaning to those skilled in the art of OO design. However, the reader should note that one of loosest definitions in the OO art is the definition of the word framework. The word framework means different things to different people. Therefore, when comparing the characteristics of two supposed framework mechanisms, the reader should take care to ensure that the comparison is indeed "apples to apples." As will become more clear in the forthcoming paragraphs, the term framework is used in this specification to describe an OO mechanism that has been designed to have core function and extensible function. The core function is that part of the framework mechanism that is not subject to modification by the framework purchaser. The extensible function, on the other hand, is that part of the framework mechanism that has been explicitly designed to be customized and extended by the framework purchaser.

OO Framework Mechanisms

While in general terms an OO framework mechanism can be properly characterized as an OO solution, there is nevertheless a fundamental difference between a framework mechanism and a basic OO solution. The difference is that framework mechanisms are designed in a way that permits and promotes customization and extension of certain aspects of the solution. In other words, framework mechanisms amount to more than just a solution to the problem. The mechanisms provide a living solution that can be customized and extended to address individualized requirements that change over time. Of course, the customization/extension quality of framework mechanisms is extremely valuable to purchasers (referred to herein as framework consumers) because the cost of customizing or extending a framework is much less than the cost of a replacing or reworking an existing solution.

Therefore, when framework designers set out to solve a particular problem, they do more than merely design individual objects and how those objects interrelate. They also design the core function of the framework (i.e., that part of the framework that is not to be subject to potential customization and extension by the framework consumer) and the extensible function of the framework (i.e., that part of the framework that is to be subject to potential customization and extension). In the end, the ultimate worth of a framework mechanism rests not only on the quality of the object design, but also on the design choices involving which aspects of the framework represent core function and which aspects represent extensible function.

ZAF—An Illustrative Framework Mechanism

While those skilled in the art appreciate that framework design is necessarily an intertwined and iterative process, example design choices for a simplistic framework mechanism are set forth in the paragraphs that follow. It should be understood, though, that this is only an example framework that is being used in this specification to illustrate and best explain framework mechanisms such that the reader can understand and appreciate the benefits and advantages of the present invention.

Framework designers determine what objects are needed for a framework mechanism by selecting objects from what is called the problem domain. The problem domain is an abstract view of the specific problem at hand. The example problem domain chosen for this illustrative framework mechanism is that of zoo administration. The specific problem is that of designing a mechanism that assists zoo keepers in the care and feeding of zoo animals. In our example of a Zoo Administration Framework (ZAF), an OO framework designer would look to the zoological problem domain and decide that any ZAF would of necessity involve a mechanism that represented the relationship between zoo keepers and animals (i.e., to represent how zoo keepers care for animals). The framework designer would also likely recognize that zoo animals usually live in cages, pens, tanks, and other sorts of containment units. Therefore, our framework designer would start with the idea that the framework would have to involve mechanisms that represented all of these fundamental entities and relationships.

How ZAF is Designed

To begin the design process, our framework designer would likely begin with what is called a category diagram. Category diagrams are used to describe high level framework mechanisms, and how those mechanisms relate to one another. FIG. 1 is a category diagram for the example framework ZAF. The notation used in FIG. 1, and that used in the other figures of this specification, is explained in detail in the Notation section at the end of this specification (pages 44–50). Each mechanism in a category diagram represents groupings of objects that perform a particular function. For the purposes of illustration, assume that our framework designer decides that ZAF should be made up of four high level mechanisms: a zoo administration mechanism, a zoo keeper mechanism, an animal mechanism, and a containment unit mechanism.

As shown in FIG. 1, the zoo administration mechanism has been designed to use the zoo keeper mechanism to administer the zoo. The zoo administration mechanism is therefore said to have a using relationship with the zoo keeper mechanism. (Again, please refer to the notation section of this specification for an explanation of this relationship and the other notation used in this specification.)

As discussed, the zoo administration mechanism has been designed to have responsibility for overall control of ZAF. Accordingly, the zoo administration mechanism is responsible for scheduling the operation of the zoo keeper mechanism. Note also that our framework designer designed the zoo administration mechanism to be a core function of ZAF, which means that it has been designed such that it will not be subject to potential customization and extension. The C in the category box denotes this fact. Please note further that the uses relationship between the zoo administration mechanism and the zoo keeper mechanism has also been designed such that it is not available for ultimate customization by the framework consumer.

The zoo keeper mechanism has been designed to be generally responsible for the care and feeding of the zoo animals. Accordingly, it uses the animal and containment unit mechanisms to perform its tasks. However, unlike the design of the zoo administration mechanism, our framework designer has designed the zoo keeper mechanism to be extensible function, which again means that the zoo keeper mechanism has been designed to be available for modification and/or extension by the framework consumer to address future care and feeding requirements. This fact is denoted by the E in the zoo keeper mechanism category box.

Our framework designer has designed the animal mechanism to represent the animal side of the interaction between zoo animals and zoo keepers. Since the animal population in the zoo is something that changes on a regular basis, the animal mechanism has similarly been designed as an extensible function. The containment unit mechanism interacts with the zoo keeper mechanism by representing individual containment units such as pens, tanks, and cages. Like the animal mechanism, the containment unit mechanism has been designed as an extensible function such that it can handle future customization and extension requirements. Please note here, however, that even though the zoo keeper, zoo animal, and containment unit mechanisms have all been designed as extensible function, the relationships between the mechanisms have been designed to be a core function of ZAF. In other words, even though it is desirable to give ZAF's consumers flexibility relative to the zoo keeper, zoo animal, and containment unit mechanisms, it is not desirable to allow ZAF's consumers to change how these mechanisms relate to one another.

Our framework designer would next design the classes and relationships that make up the mechanisms shown on FIG. 1. A class is a definition of a set of like objects. As such, a class can be thought of as an abstraction of the objects or as a definition of a type of object. From the view of a computer system, a single object represents an encapsulated set of data and the operation or a group of operations that are performed by a computer system upon that data. In fact, in a secure computer system, the only access to the information controlled by an object is via the object itself. This is why the information contained in an object is said to be encapsulated by the object.

Each class definition comprises data definitions that define the information controlled by the object and operation definitions that define the operation or operations performed by objects on the data that each object controls. In other words, a class definition defines how an object acts and reacts to other objects by defining an operation or set of operations that is/are performed on the defined data. (Please note that operations are sometimes called methods, method programs, and/or member functions.) When taken together, the defined operation(s) and data are said to be the behavior of the object. In essence, then, a class definition defines the behavior of its member object or objects.

Figure 2A:
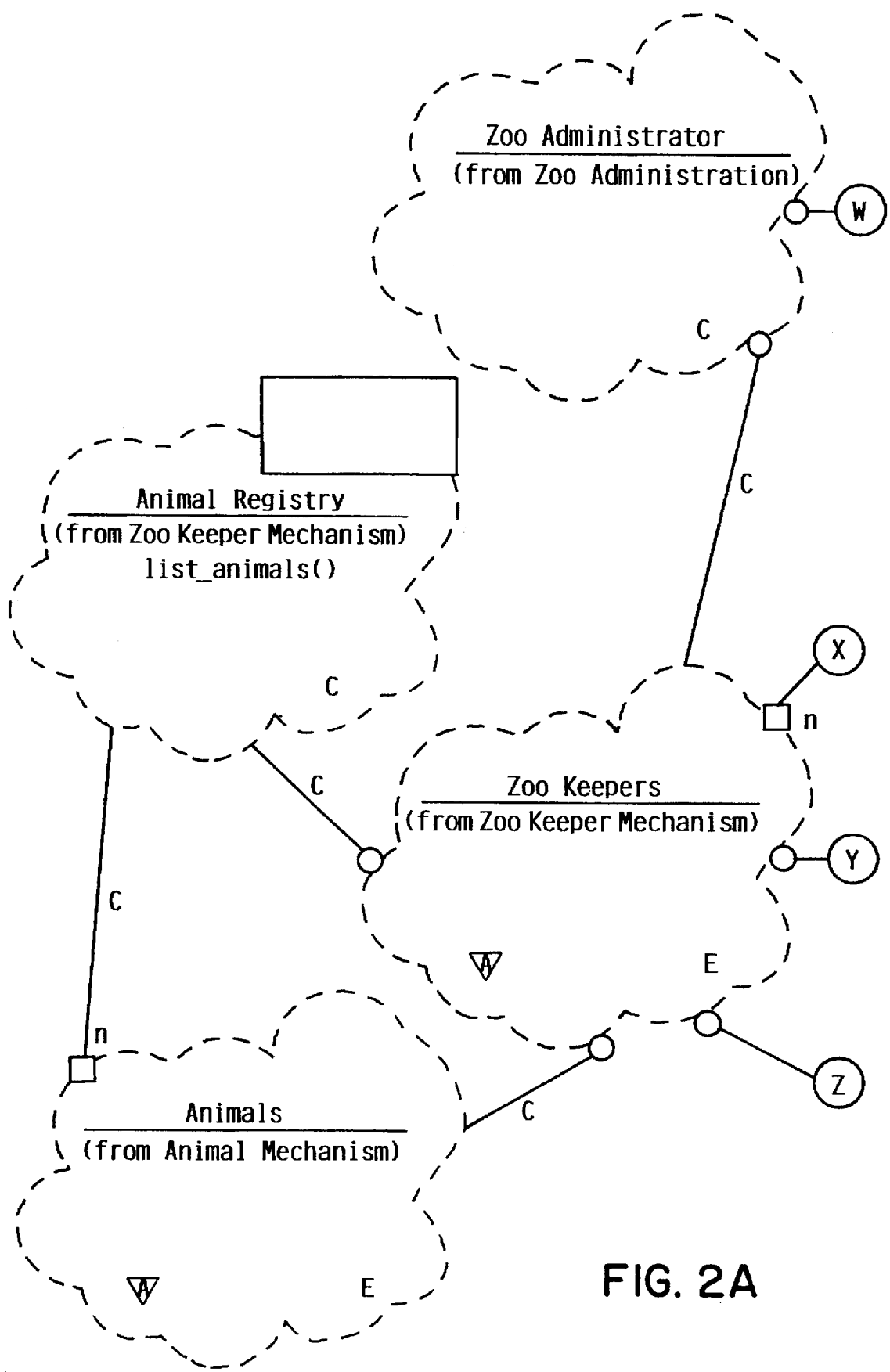
FIGS. 2 through 6 are class diagrams for the example framework mechanism of FIG. 1.
Figure 2B:
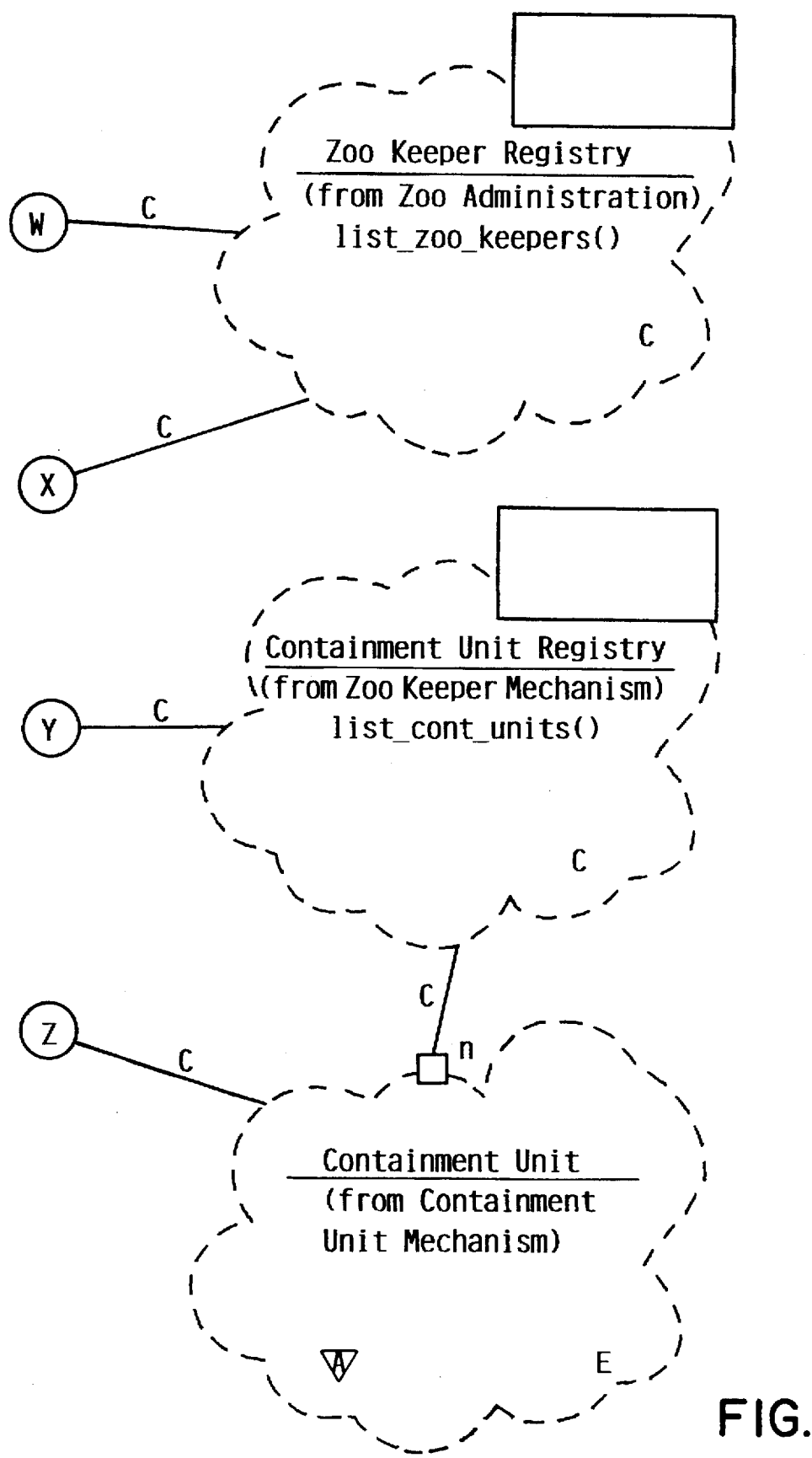

FIG. 2 is an OO class diagram that shows the fundamental classes that our framework designer has designed for ZAF. Each class representation includes its relationship to the mechanisms shown on FIG. 1. For example, we can see that the zoo keepers class is denoted as being from Zoo Keeper Mechanism. The fundamental classes of ZAF include: the zoo administrator class, which is part of the zoo administration mechanism; the zoo keeper registry class, which is also part of the zoo administration mechanism; the animal registry class, which is part of the zoo keeper mechanism; the zoo keepers class, which is also part of the zoo keeper mechanism; the containment unit registry class, which is also part of the zoo keeper mechanism; the animals class, which is part of the animal mechanism; and the containment unit class, which is part of the containment unit mechanism.

Please note again that the relationships between the classes have been designed as core function of ZAF such that they are not available for ultimate modification by ZAF's consumers.

The zoo administrator class is the definition of the object that is responsible for the overall control of ZAF. Again, OO classes only define the objects that interact to provide a solution to the problem. However, it is by exploring the characteristics of the class definitions that we are able to understand how the objects of the framework mechanism have been designed to provide a living solution that can be customized and/or extended to address future requirements.

The zoo administrator class has been designed to have a uses relationship with the zoo keeper registry. Our framework designer has designed the zoo administrator and zoo registry classes to be a core function of ZAF because our designer has decided that ZAF's consumers should not be allowed to modify the behavior of objects that are members of these class definitions. The zoo keeper registry, which has what is called a contains by reference relationship with the zoo keeper class, is simply a class that defines an object that is a container for all zoo keeper objects. Accordingly, the zoo keeper registry includes a definition for a list_zoo_keepers( ) operation. As will be described later, this operation is responsible for providing a list of zoo keeper objects to other objects that request such a list.

Figure 3:
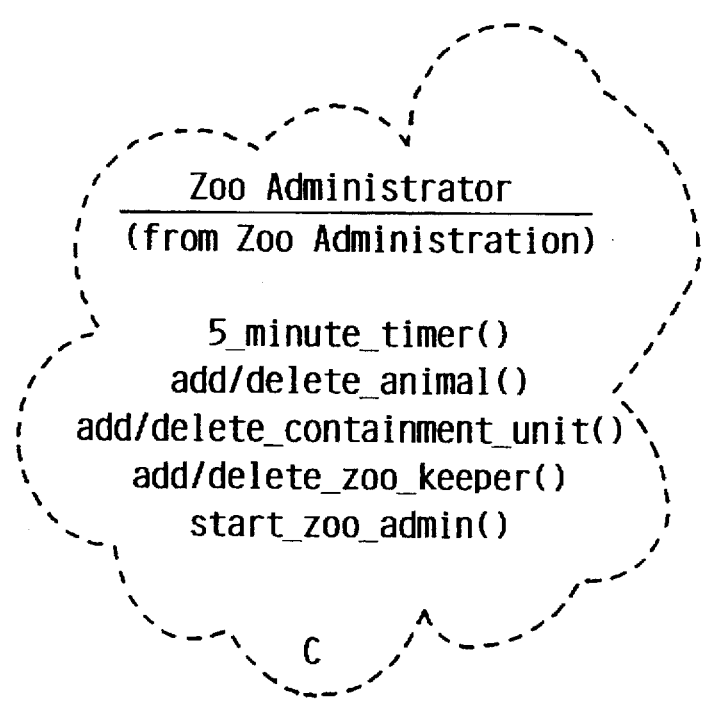

FIG. 3 shows a lower level view of the zoo administrator class. Since objects of type zoo administrator have responsibility for overall control of ZAF, the zoo administrator class has been designed to include operations that perform tasks oriented towards zoo administration. The class definition includes the following five operations: 5_minute_timer( ), add_animal( ), add_containment_unit( ), add_zoo_keeper( ), and start_zoo_admin( ).

The start_zoo_admin( ) operation is responsible for starting ZAF. That is, a user or system administrator will interact with the start_zoo_admin( ) operation to begin administration of a zoo via ZAF. Once started, our framework designer has designed the start_zoo_admin( ) operation to initiate the 5_minute_timer( ) operation. Every five minutes, the 5_minute_timer( ) operation instructs the zoo keeper objects to go out and check on the animals. The add/delete_zoo_keeper operation is responsible for interacting with users of ZAF to define additional zoo keepers (i.e., additional zoo keeper classes), to add additional zoo keepers (i.e., zoo keeper objects), and to remove zoo keeper classes and/or objects. As will become clear in the forthcoming paragraphs, each zoo keeper object is responsible for performing a particular zoo task. Therefore, it is natural that a user of ZAF might well want to add a zoo keeper definition and object to handle an additional zoo task or to remove a definition or object that is no longer needed. As will be seen, this flexibility is provided by designing the zoo keeper mechanism as an extensible function.

Like the add/delete_zoo_keeper operation, the add/delete_animal( ) operation is responsible for interacting with users to define additional zoo animal classes and objects and to remove classes and objects that are no longer needed. Again, it is quite natural for a zoo to need to add and remove animals. The add/delete_containment_unit( ) operation is responsible for the definition of new containment unit classes and objects and for removal of classes and/or objects that are no longer necessary. Again, our framework designer has designed ZAF in a way that provides this flexibility by designing the animal and containment unit mechanisms as extensible functions.

Referring back to FIG. 2, the zoo keepers class definition has a uses relationship with the animal registry, animals containment unit registry, and containment units classes. Since the value of ZAF is enhanced by allowing ZAF's consumers to customize and extend the zoo keepers, animals, and containment unit classes, these classes have been designed as extensible function. However, changing the behavior of the animal and containment unit registry classes would disrupt the basic operation of ZAF. Therefore, these classes have been designed to be core functions of ZAF.

While the classes and categories within ZAF have been described as either core functions or extensible functions, it is important to note that the term "core function" as used herein broadly relates to requirements that cause the framework to operate in the desired manner. In simple terms, core functions of a framework are the functions that any program that uses the framework will perform. The requirements of core functions may be imposed by the structure of the framework (e.g., by designating certain classes as core functions) or may be imposed by functional requirements that dictate how a framework consumer may utilize the framework. Thus, core functions include not only the classes and class relationships that are designated as core, but may also include extensible classes that must be implemented in particular ways for the framework to function properly. Said another way, while extensible function is that part of the framework that is designed to be customized by the framework consumer, the nature and extent of the customization is governed by the requirements of the framework's core function (i.e., the overall framework function imposed by the structure and functional requirements of the framework). For example, the animals class has been designed as extensible function of ZAF so that ZAF can be customized to accommodate different types of animals. However, the ability to customize the extensible animals class does not imply that the nature of the customization can violate the basic structure imposed by the core function of ZAF (e.g., by customizing the animal class to the extent that it can no longer be reasonably said to represent a type of animal).

Figure 4:
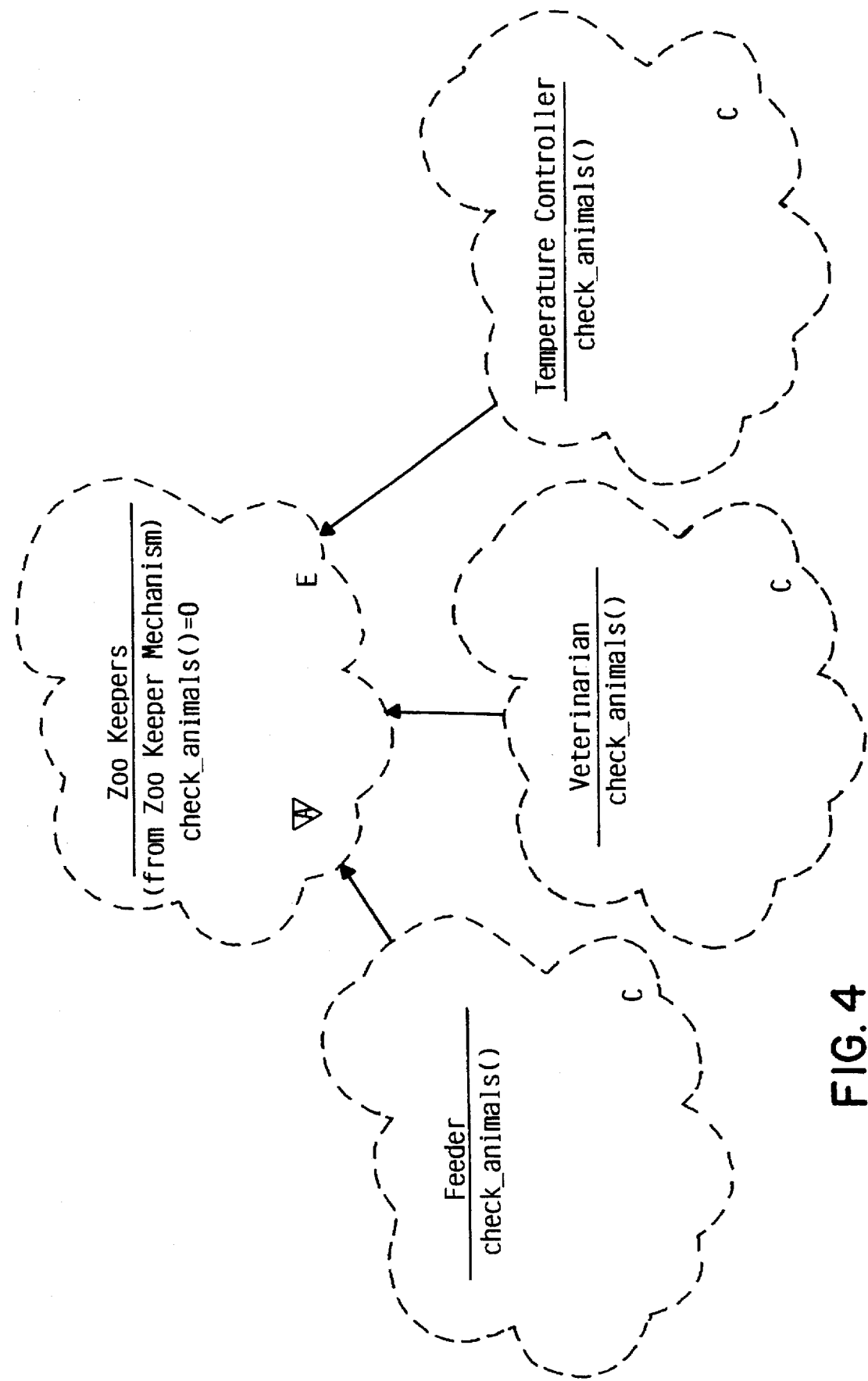

FIG. 4 is a class diagram of the zoo keeper class. However, before describing the details of FIG. 4, it is worthwhile to point out that the class definitions shown on FIG. 4 are ranked in a very simple ordering called a class hierarchy. A class, like the zoo keeper class, that represents the most generalized/abstract class in a class hierarchy is referred to as the base class of the hierarchy. The ordering of classes in a class hierarchy goes from most general to least general (i.e., from general to specific). Less general classes (e.g., the feeder class) are said to inherit characteristics from the more general class or classes (i.e., the zoo keeper class in this case). As such, class definitions feeder, veterinarian, and temperature controller are said to be subclasses of the zoo keeper class. Inheritance mechanisms will be explored in more detail in the discussion associated with FIG. 5.

As shown on FIG. 4, the zoo keeper class definition contains a single operation definition, the check_animals( ) operation definition. The reader should also note that the zoo keepers class definition is marked as being an abstract class. Abstract classes are not designed to have objects created as their members, but are instead used to define a common interface/protocol for their subclasses. A class is said to be an abstract class when at least one of its operation definitions is a pure virtual operation definition. Pure virtual operation definitions are designed for the sole purpose of defining a common interface for subclass definition of that operation. In other words, the design of the actual behavior (i.e., the data and operations) is left to the subclasses themselves. In the case of the zoo keeper class definition, the feeder, veterinarian, and temperature controller subclasses define specific implementations of the pure virtual check_animals( ) operation definition that is contained in the zoo keeper class. An operation is marked as a pure virtual when it is set equal to 0.

It is important to note, though, that the common interface of a pure virtual operation definition must be honored by all subclasses such that requesting objects (called client objects) can use subclass member objects (called server objects) without needing to know the particular subclass of the server object. For example, whenever the object defined by the zoo administrator class needs a particular action performed, it interacts with a zoo keeper object. Because the interface to these objects was defined in abstract, base class zoo keeper and preserved in the subclass definitions for the check_animals( ) operation, the zoo administrator object need not have special knowledge about the subclasses of any of the server objects. This has the effect of decoupling the need for the action (i.e., on the part of the zoo administrator object) from the way in which the action is carried out (i.e., by one of the objects of the zoo keepers subclasses). Designs (like the ZAF design) that take advantage of the characteristics of abstract classes are said to be polymorphic.

Polymorphism is extremely important to OO framework design because it allows the way in which something is done (called the implementation) to be changed or extended without effecting the mechanisms that depend on the fact the action is actually performed. In other words, client objects need only understand that certain objects perform certain functions, not how those functions are actually carried out. This is one way in which a properly designed framework can be readily customized and extended to satisfy future requirements.

Figure 5:
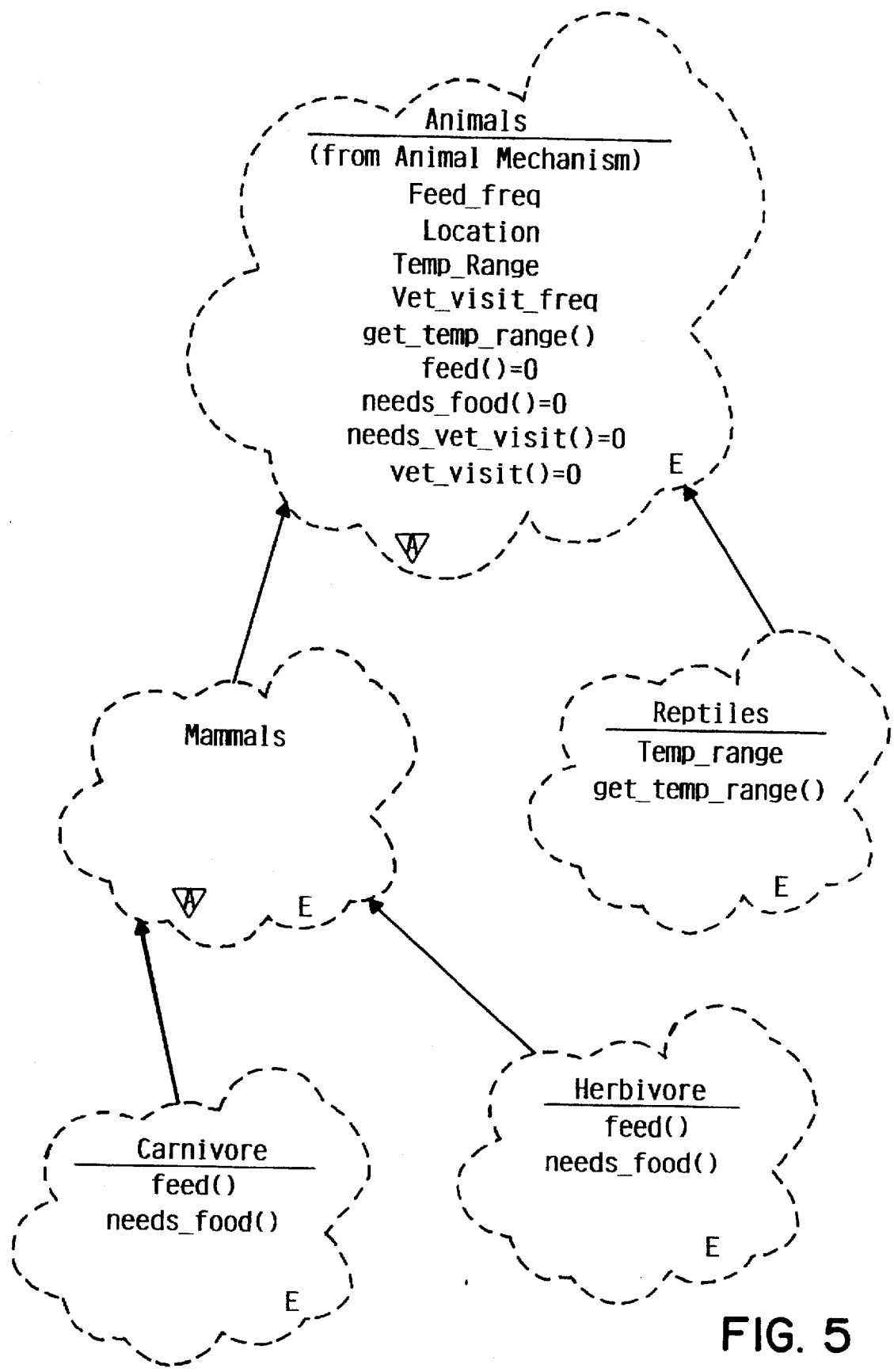

As previously discussed, our framework designer has designed ZAF such that zoo keeper objects interact with animal and containment unit objects to perform their tasks. FIG. 5 is a class diagram for the class hierarchy of the abstract class animal. Since the animals class definition is responsible for representing the characteristics and behavior of zoo animals, the framework designer has designed abstract class animal in a way that reflects this responsibility. As shown, the example animal class definition includes data definitions feed_freq, location, and temp_range and operation definitions get_temp_range( ), feed( ), needs_food( ), needs_vet_visit( ), and vet_visit( ).

For the purposes of this framework overview, it is not necessary to explore each definition in detail. However, the temp_range data definition and the get_temp_range( ) and feed( ) operation definitions are good examples of well thought out framework design choices.

The feed( ) operation definition is designed to perform the actual feeding of the animals (i.e., through specific feeding apparatus which is not shown). The feed( ) operation is a pure virtual operation. Again, this means that the design of the class is such that the actual mechanism that performs the needed function has been left to be defined by the subclasses. Requiring subclass definition is a good design choice in cases like this where objects that are created as members of the subclasses have particularized needs. In ZAF, for example, each type of animal is likely to have need for a particularized feeding apparatus, which not only makes definition of a generic feed( ) operation difficult, but valueless.

By way of comparison, the framework designer has explicitly designed the get_temp_range( ) operation such that it is not a pure virtual operation definition. This means that get_temp_range( ) has been generically defined as a default operation. As such, it is considered a virtual operation. Default operations are used to provide generic function to subclasses. The subclasses can simply use the default operations or they can customize or extend the default operations by redefinition. Redefinition of a default operation is called overriding the default operation.

Mammals is a subclass of class animals, and as such, mammals inherits all of the characteristics of class animals. Please note that class mammals is also designed as an abstract class, which again means that it has not been designed to have objects created as its members, but has instead been designed to provide a common interface for its subclasses. Subclass mammal is further subclassed into classes carnivore and herbivore.

Since definition of the feed( ) operation has been left up to the subclasses, subclasses carnivore and herbivore each have their own definition of the feed( ) operation. Again, this is a good design choice because meat eating carnivores are going to have different needs than their plant eating counterparts.

Temp_range is a data definition for the range of temperatures that coincides with that of the specific animal's natural habitat and the get_temp_range( ) operation definition is designed to retrieve the temp_range for a specific animal and return it to a requesting client object. Subclass reptiles contains its own data definition for temp_range and its own definition for the get_temp_range( ) operation. ZAF has been designed this way to point out that data definitions can be overridden just like operation definitions. Since many reptiles live in desert conditions, where nights can be very cold and days very hot, the default temp_range definition has been overridden in the reptiles class to include time and temperature information (not explicitly shown on FIG. 5). This is another good design choice because it allows ZAF to treat reptile containment units differently than other containment units by allowing temperature adjustments to be made based on the time of day as well as on the current temperature of the containment unit itself.

Figure 6:
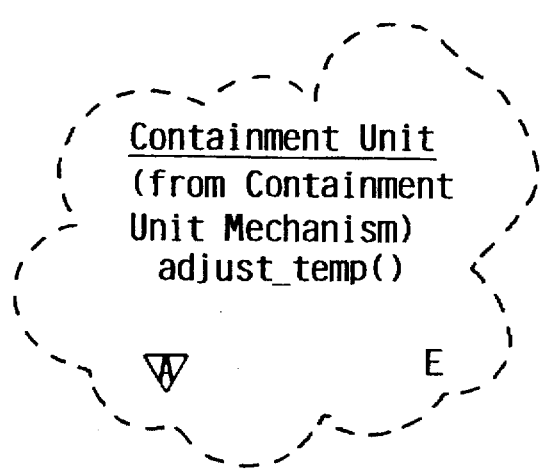

FIG. 6 is a class diagram showing a lower level view of the containment unit class. The containment unit class contains virtual operation definition adjust_temp( ). The adjust_temp definition defines both the interface and mechanism used to actually adjust the temperature in the containment units of the zoo (i.e., via heating and cooling mechanisms which are not shown).

How the ZAF Objects Interact

Beyond designing the objects that make up the solution to the specific problem, our framework designer must also design how the individual objects interrelate. In other words, the objects must interrelate in way that takes advantage of the manner in which they were designed. As discussed, the way in which the defined operations of an object operate on the data defined for the object is called the object's behavior. While objects may be characterized as autonomous entities, it is still very important that each object exhibit a consistent behavior when interrelating with other objects. Consistent behavior is important because objects depend upon the consistent behavior of other objects so that they themselves can exhibit consistent behavior. In fact, consistent behavior is so important that an object's behavior is often referred to as the contract the object has with the other objects. When an object does not exhibit a consistent behavior, it is said to have violated its contract with the other objects.

When an operation of one object needs access to the data controlled by a second object, it is considered to be a client of the second object. To access the data controlled by the second object, one of the operations of the client will call or invoke one of the operations of the second object to gain access to the data controlled by that object. One of the operations of the called object (i.e., a server operation in this case) is then executed to access and/or manipulate the data controlled by the called object.

Figure 7A:
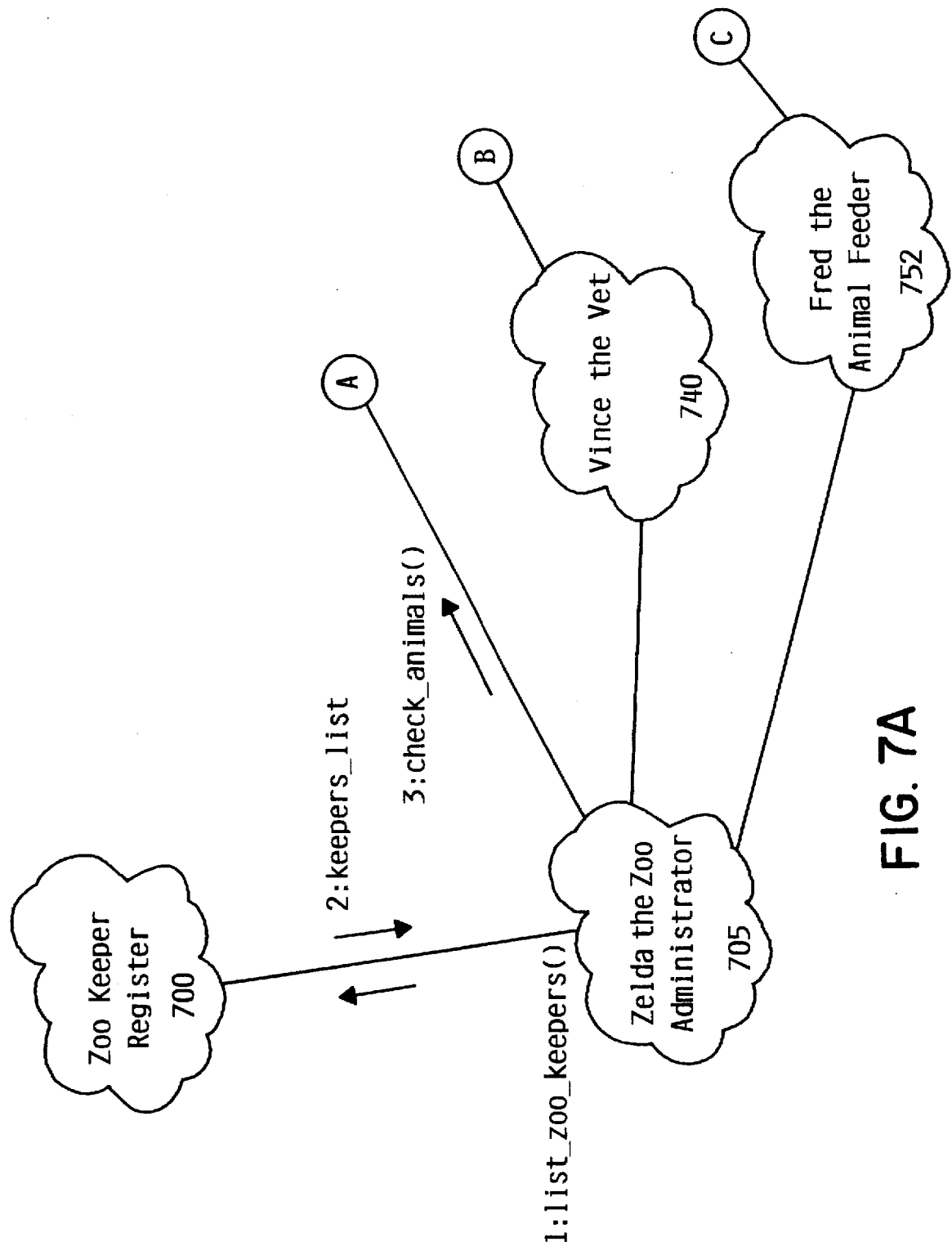
FIG. 7 is an object diagram for the example framework mechanism of FIGS. 1 through 6.
Figure 7B:
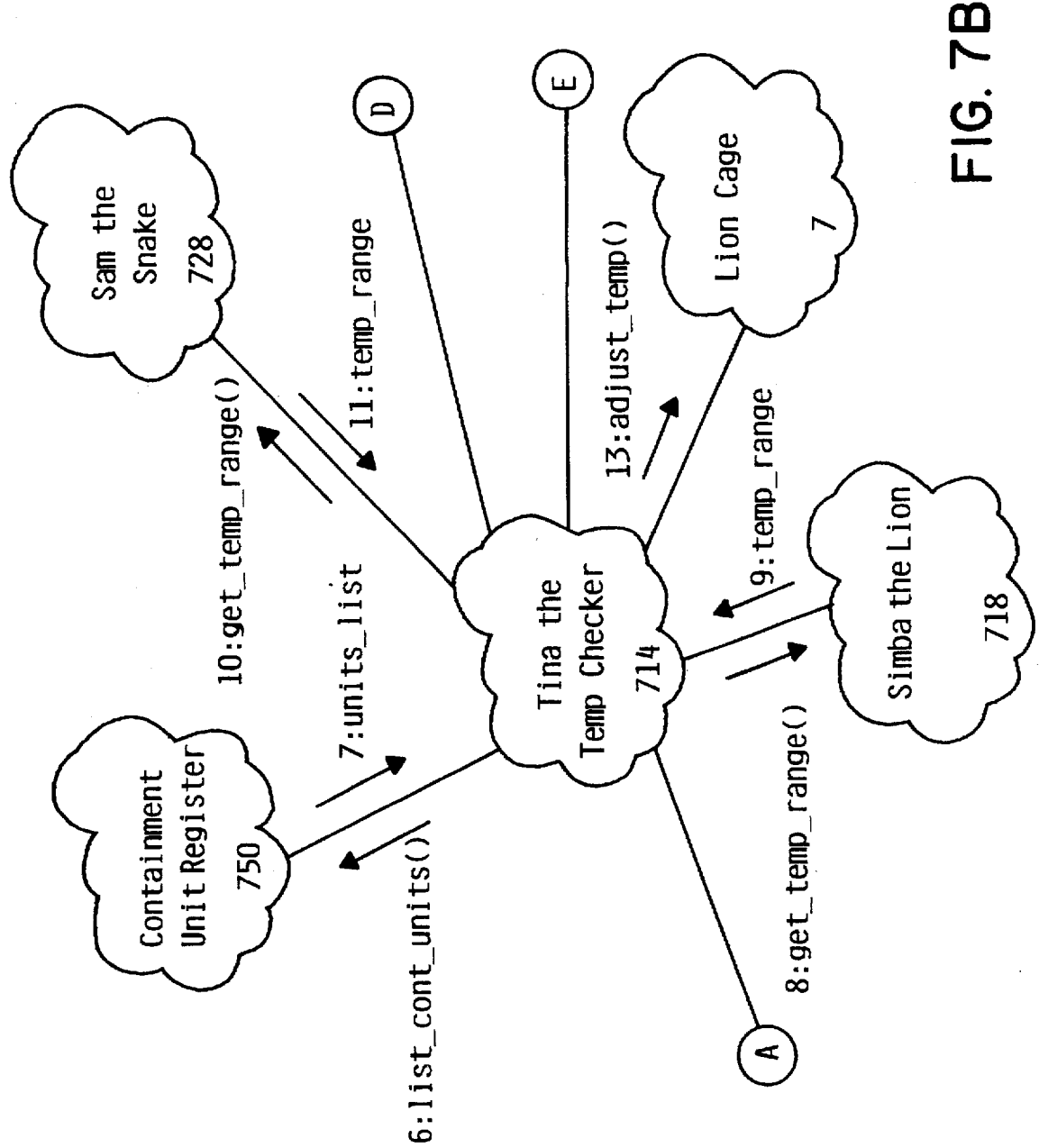

FIG. 7 is an object diagram showing how the example objects of ZAF interact to assist zoo personnel in operating the zoo. A detailed analysis of the interaction of all of the ZAF objects is unnecessary for the purposes of this overview. However, the reader should review the following simple control flow to obtain a rudimentary understanding of how objects interact to solve problems.

As mentioned, an object is created to be a member of a particular class. Therefore, Zelda the Zoo Administrator [object 706] is an object that is a member (actually the only member) of the zoo administrator class. As such, object Zelda is responsible for overall control of ZAF. All of the zoo keeper objects have registered with the Zoo Keeper Register object [object 700]. Therefore, object Zelda obtains a list of the current zoo keepers by calling the list_zoo_keepers( ) operation [step 1] of the Zoo Keeper Register object. The Zoo Keeper Register object has been created as a member of the zoo keeper register class. For the purposes of illustration, assume that this occurs every five minutes as part of Zelda's 5_minute_timer( ) operation. The Zoo Keeper Register object then responds with the zoo keepers list [step 2]. The list of zoo keepers includes Tina the Temperature Checker [object 714], Vince the Vet. [object 740], and Fred the Animal Feeder [object 752]. Each zoo keeper has been created as a member of the zoo keepers class. In particular, objects Tina the Temp. Checker, Vince the Vet., and Fred the Feeder are respectively members of the temperature controller, veterinarian, and feeder subclasses.

Once the list of current zoo keepers has been returned to object Zelda, object Zelda instructs each zoo keeper in the list to check the animals by calling the check_animals( ) operation of each zoo keeper object [only the call to Tina the Temp. Checker is shown—step 3]. Please note that object Zelda did not need to understand the types of zoo keepers that were in the zoo keeper list, the number of zoo keeper objects in the list, or the specialized characteristics of any one zoo keeper object. Object Zelda uses the same interface (i.e., the check_animals( ) operation) to communicate with each zoo keeper object. It is then up to the individual zoo keeper objects to perform the task for which they have been created. Each zoo keeper object performs its assigned task through use of its own check_animals( ) operation. For example, object Tina's check_animals( ) operation retrieves a list of current animals from the animal registry object by calling the list_animals( ) operation [step 4] and then a list of containment units from the containment unit register object by calling the list_cont_units( ) operation [step 6]. Upon examining the animal list, object Tina's check_animals( ) operation determines that there are only two animals currently registered in the zoo, Sam the Snake [object 728] and Simba the Lion [object 718].

Object Tina's check_animals( ) operation then calls the get_temp_range( ) operations to get temperature ranges from objects Sam and Simba [steps 8 and 10]. Once the temperature ranges have been returned, the check_animals( ) operation of object Tina determines which containment units house the respective animals (i.e., Simba and Sam) and then calls the adjust_temp( ) operation of the appropriate containment unit (i.e., Lion Cage 7 in the case of object Simba and Snake Pit 3 in the case of object Sam) to adjust the temperature of the containment units [steps 12 and 13].

The adjust_temp( ) operation of each containment unit then completes the control flow by proceeding to adjust the temperature in a way that is appropriate for the animals contained in each containment unit. (That is, the temperature is adjusted based on time and temperature for Snake Pit 3 and based on time alone for Lion Cage 7.) The reader should note that the relationship between the check_animals( ) operation and the adjust temp( ) operations is polymorphic. In other words, the check_animals( ) operation of object Tina does not require specialized knowledge about how each adjust_temp( ) operation performs its task. The check_animals( ) operation merely had to abide by the interface and call the adjust_temp( ) operations. After that, it is up to the individual adjust_temp( ) operations to carry our their tasks in the proper manner.

At this point, it is again worthwhile to point out that the ZAF mechanism is an extremely simplistic framework mechanism that has been presented here to help novice readers understand some basic framework concepts so as to best appreciate the benefits and advantages of the present invention. These benefits and advantages will become more clear upon reference to the following Detailed Description.

DETAILED DESCRIPTION

Figure 8:
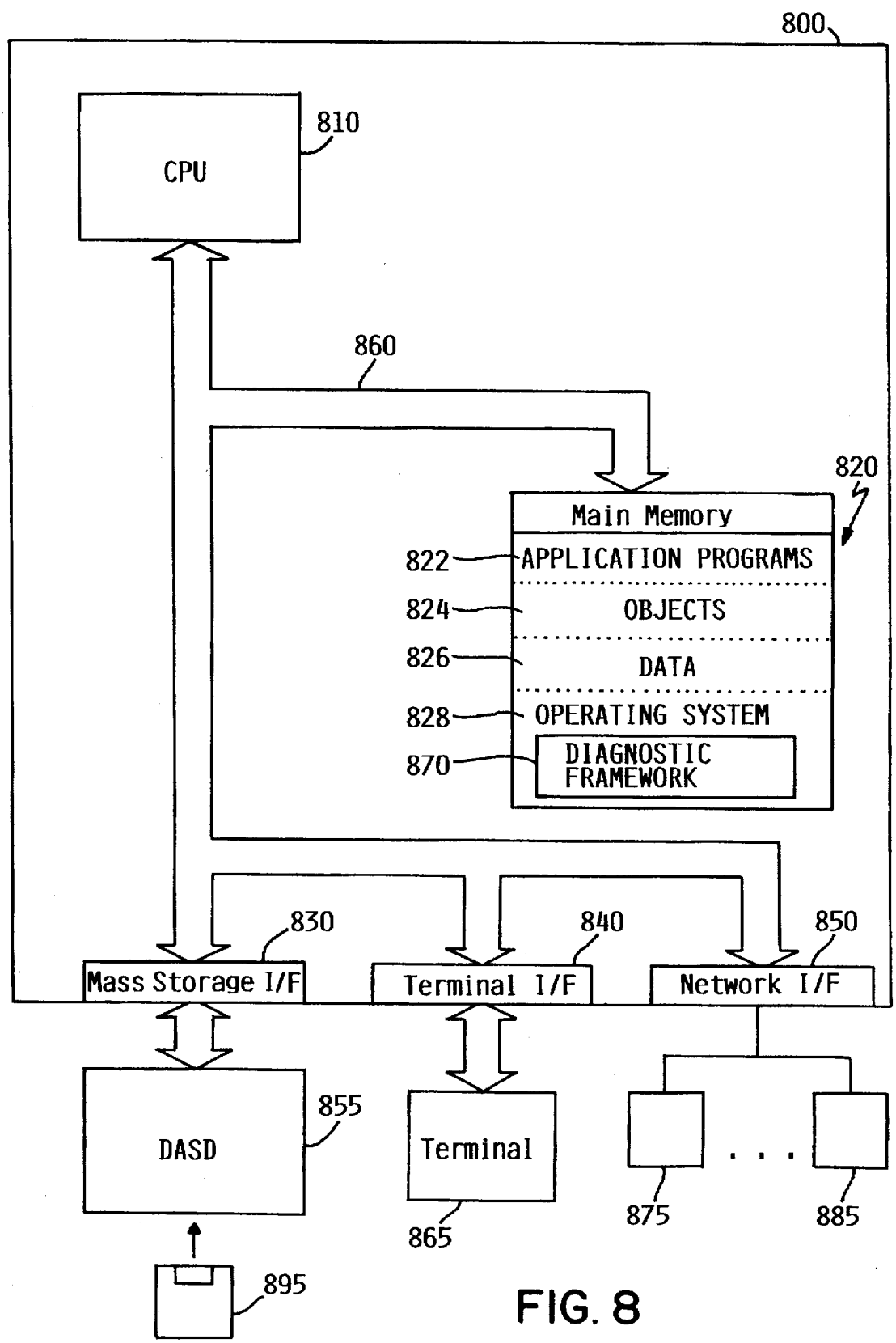
FIG. 8 is a block diagram of the computer system used in the preferred embodiment.

FIG. 8 shows a block diagram of the computer system of the present invention. The computer system of the preferred embodiment is an enhanced IBM AS/400 computer system. However, those skilled in the art will appreciate that the mechanisms and apparatus of the present invention apply equally to any computer system, regardless of whether the computer system is a complicated multi-user computing apparatus or a single user workstation. As shown in the exploded view of FIG. 8, computer system 800 comprises main or central processing unit (CPU) 810 connected to main memory 820, mass storage interface 830, terminal interface 840, and network interface 850. These system components are interconnected through the use of a system bus 860. Mass storage interface 830 is used to connect mass storage devices (such as DASD device 855) to computer system 800. One specific type of DASD device is a floppy disk drive, which may store data to and read data from a floppy diskette 895.

Main memory 820 contains application programs 822, objects 824, data 826, and an operating system 828. Computer system 800 utilizes well known virtual addressing mechanisms that allow the programs of computer system 800 to behave as if they only have access to a large, single storage entity instead of access to multiple, smaller storage entities such as main memory 820 and DASD device 855. Therefore, while application programs 822, objects 824, and operating system 828 are shown to reside in main memory 820, those skilled in the art will recognize that these programs are not necessarily all completely contained in main memory 820 at the same time. (It should also be noted that the term "computer system memory" is used herein to generically refer to the entire virtual memory of computer system 800.)

Operating system 828 is a multitasking operating system known in the industry as OS/400; however, those skilled in the art will appreciate that the spirit and scope of the present invention is not limited to any one operating system. Operating system 828 is further shown to contain the diagnostic framework mechanism 870 of the present invention, which is in accordance with the preferred embodiment of the invention. Operating system 828 preferably supports an object oriented programming environment such as that provided, for example, by the C++ programming language, and framework mechanism 870 is preferably an object oriented framework mechanism. However, the scope of the invention is not limited to object oriented framework mechanisms within operating systems, and framework mechanism 870 (whether object oriented or not) may exist external to operating system 870 (e.g., within application programs 822).

Although computer system 800 is shown to contain only a single main CPU and a single system bus, those skilled in the art will appreciate that the present invention may be practiced using a computer system that has multiple CPUs and/or multiple buses. In addition, the interfaces (called input/output processors in AS/400 terminology) that are used in the preferred embodiment each include separate, fully programmed microprocessors that are used to off-load compute-intensive processing from CPU 810. However, those skilled in the art will appreciate that the present invention applies equally to computer systems that simply use I/O adapters to perform similar functions.

Terminal interface 840 is used to directly connect one or more terminals 865 to computer system 800. These terminals 865, which may be non-intelligent or fully programmable workstations, are used to allow system administrators and users to communicate with computer system 800.

Network interface 850 is used to connect other computer systems and/or workstations (e.g., 875 and 885 in FIG. 8) to computer system 800 in networked fashion. The present invention applies equally no matter how computer system 800 may be connected to other computer systems and/or workstations, regardless of whether the connection(s) is made using present-day analog and/or digital techniques or via some networking mechanism of the future. It is also important to point out that the presence of network interface 850 within computer system 800 means that computer system 800 may engage in cooperative processing with one or more other computer systems or workstations. Of course, this in turn means that the programs shown in main memory 820 need not necessarily all reside on computer system 800. For example, one or more programs of application programs 822 may reside on another system and engage in cooperative processing with one or more programs that reside on computer system 800. This cooperative processing could be accomplished through use of one of the well known client-server mechanisms such as remote procedure call (RPC).

At this point, it is important to note that while the present invention has been (and will continue to be) described in the context of a fully functional computer system, those skilled in the art will appreciate that the present invention is capable of being distributed as a program product via floppy disk (e.g., 895 of FIG. 8), CD ROM, or other form of recordable media, or via any type of electronic transmission mechanism.

Diagnostic Framework Mechanism of the Present Invention

The present invention avoids many of the pitfalls of prior art diagnostic systems by providing a diagnostic framework that is extended with relative ease to support new diagnostics. In the preferred embodiment, the diagnostic framework is provided as an integral part of an operating system, such as OS/2 or AIX. The diagnostic framework provides architectural support in the operating system for users of the operating system to perform custom diagnostics. With the diagnostic framework in the operating system, there are two different levels of extensibility for the framework. The first level is for application programmers, who may develop diagnostic applications to perform certain tests. The provider of the operating system may choose to support testing using the diagnostic framework by supplying diagnostic applications with the operating system. In the alternative, third parties may supply diagnostic applications that use the diagnostic framework. One example of a diagnostic application is a system test for a computer system that is run when the computer system is first powered up. A suitable system test application would likely include a variety of different tests, including testing of memory, testing of the hard disk subsystem, testing of the I/O ports, etc. The application would interface with the framework to perform these functions, but would not necessarily know the details regarding each test it must perform.

A second level of extensibility allows vendors to support the testing of their hardware or software products. For the framework to exercise hardware/software in the appropriate manner, the vendors must provide specific information regarding how the appropriate features of their products are to be tested. This is achieved by vendor extensible functions which allow product-specific test information to be provided by vendors and then utilized by the framework in a consistent manner. For example, the application referenced above for a system test of a computer system on power-up may specify that a memory test be performed, but the vendor of the particular memory board in the computer system would need to provide information relating to exactly how and what features of the memory are to be tested. The vendor would accomplish this by implementing the vendor extensible functions of the diagnostic framework to test its memory product. By providing product-specific test information in this manner, the vendor may therefore benefit from existing diagnostic applications which provide two features: end user interfaces to the diagnostic framework, and control logic that determines when to appropriately utilize the vendor's diagnostics. Of course, in the alternative, the vendor may interface directly to the diagnostic framework by generating its own application to test its product.

Due to these two different levels of extensibility, application-extensible functions are distinguished herein from vendor-extensible functions. For the drawings herein, care functions are labeled with a C, application-extensible functions are labeled with an AE, and vendor-extensible functions are labeled with a VE. The distinction between application-extensible (AE) and vendor-extensible (AE) functions are shown only to illustrate the benefits that may accrue from this two-tiered approach to extensibility. All application-extensible (AE) and vendor-extensible (VE) functions are collectively "extensible functions", and the specific division between AE functions and VE functions is shown herein as one possible design choice, and should not be construed as limiting the application of the present invention.

Another significant benefit of the framework of the present invention is the ability to control diagnostic functions using a technique known as scripting. Diagnostic scripting is known in the art, and is a common way to allow a programmer to separate a diagnostic application from the attributes of the test. This separation allows an application programmer, for example, to implement a sophisticated diagnostic application without knowing the implementation details of the individual tests; as in many cases, the person or company developing the diagnostic application is not the same person or company developing the tests. A diagnostic script is, in essence, a complete diagnostic unto itself, comprised of three things; a set of tests, a set of actions which may perform a test, and a mechanism for selecting an action based on interpretation of a test's results. The diagnostic framework of the present invention defines a protocol for executing scripts. The fact that the framework is object oriented, while not essential to the broad concept of the invention, allows the user of the framework to easily define the needed scripts by subclassing from the classes defined within the framework using known object oriented programming environments, such as C++. The preferred embodiment of the present invention is an object oriented diagnostic framework. While many different designs and implementations are possible, one suitable example of an object oriented diagnostic framework is disclosed below to illustrate the broad concepts of the present invention.

Figure 9:
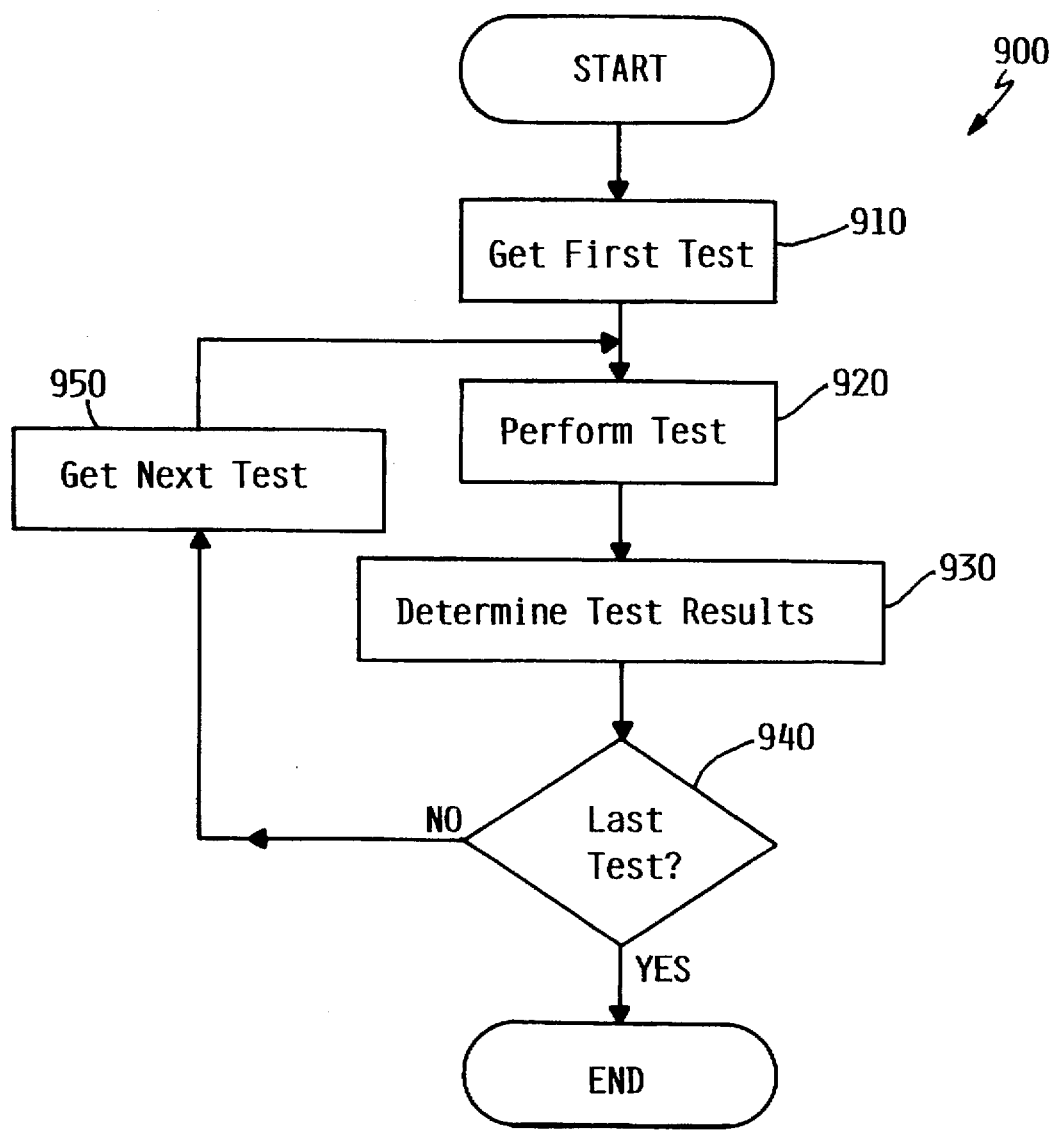
FIG. 9 is a flow diagram showing steps in accordance with the present invention to perform core functions of the framework mechanism.

Referring to FIG. 9, the core functions of a framework mechanism in accordance with the present invention may be represented by a series of steps in a method 900 that the framework mechanism performs. The first step in method 900 is to get the first test to be run (step 910). This test is then performed (step 920), and the results of performing the test are determined (step 930). Method 900 then determines whether the current test is the last test to be run (step 940). If so (step 940=YES), testing is complete. If not (step 940=NO), method 900 then gets the next test to be performed (step 950), performs this test (step 920) determines the results of performing the test (step 930), and continues testing in this manner until the last test is performed (step 940=YES).

In the preferred embodiment of the diagnostic framework mechanism disclosed herein, the tests are specified in a diagnostic script that determines the ordering of the tests. After performing a test (step 920), the results of the test are determined (step 930), and the results may determine which test is selected next (step 950). By dynamically determining which test to perform based on the previous test result, the framework mechanism allows for very powerful and efficient diagnostic scripts. For example, a script may be written which will skip a large number of detailed tests if a high level test returns satisfactory results, while also allowing detailed low-level testing if the high level test determines that a problem exists.

The step 940 of determining when the last test has been performed may be accomplished using any suitable technique. For example, the preferred embodiment uses a special identifier to indicates that one or more tests are the last test to be performed. When method 900 encounters a test that contains this special identifier, it knows that this is the last test. In an alternative implementation, a last test may be identified by its location (e.g., address) relative to other tests. In short, any suitable method for identifying one or more tests as the last test to be performed is within the scope of the present invention.

The framework mechanism disclosed herein may be implemented using any suitable program development environment (whether object oriented or not), but the preferred embodiment is an object oriented framework mechanism, as described in more detail below.

Class Definitions

Figure 10:
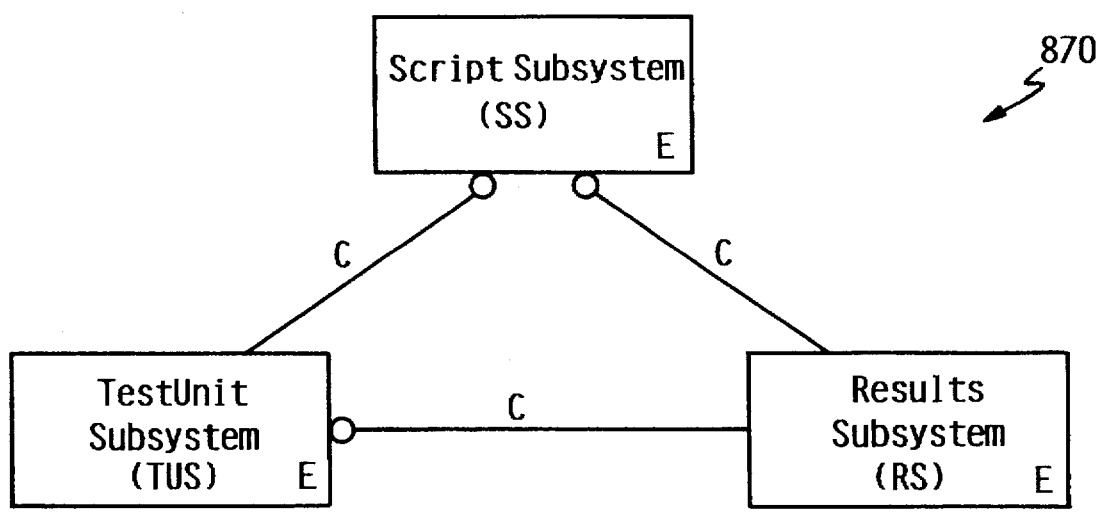
FIG. 10 is a category diagram of a framework mechanism constructed in accordance with the teachings of the present invention.
Figure 11A:
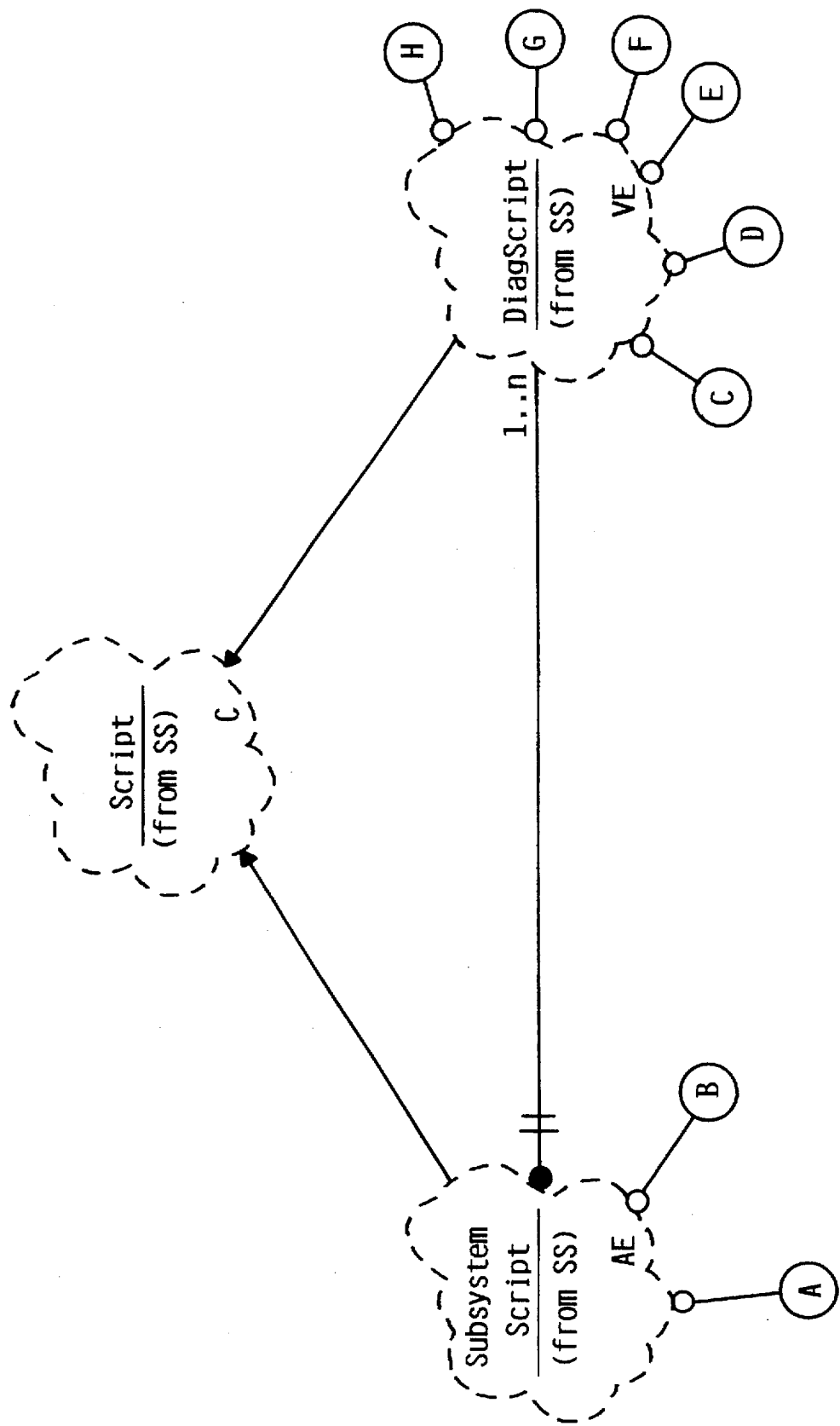
FIGS. 11–14 and 16 are class diagrams of a framework mechanism constructed in accordance with the teachings of the present invention.
Figure 11B:
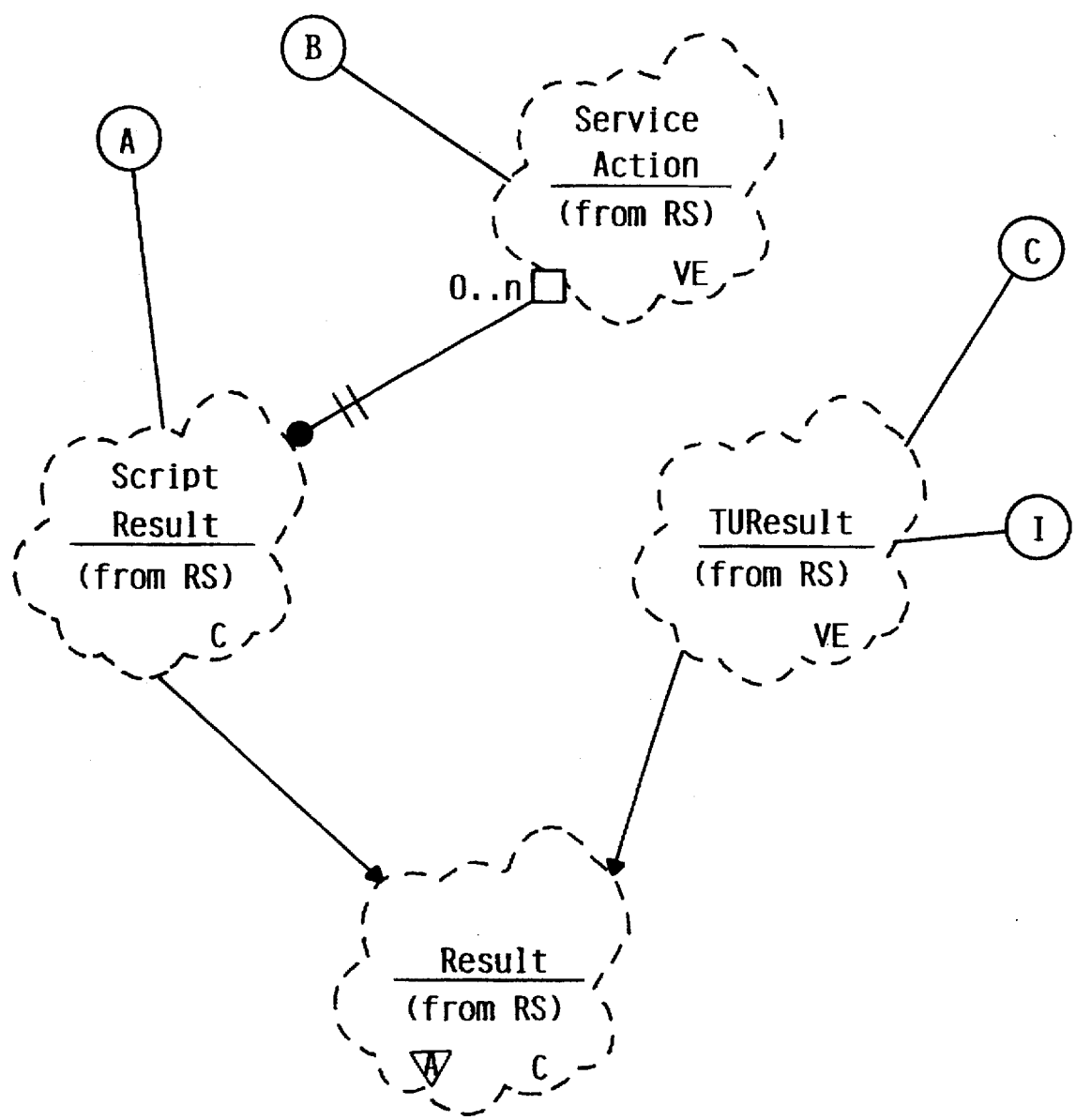
Figure 11C:
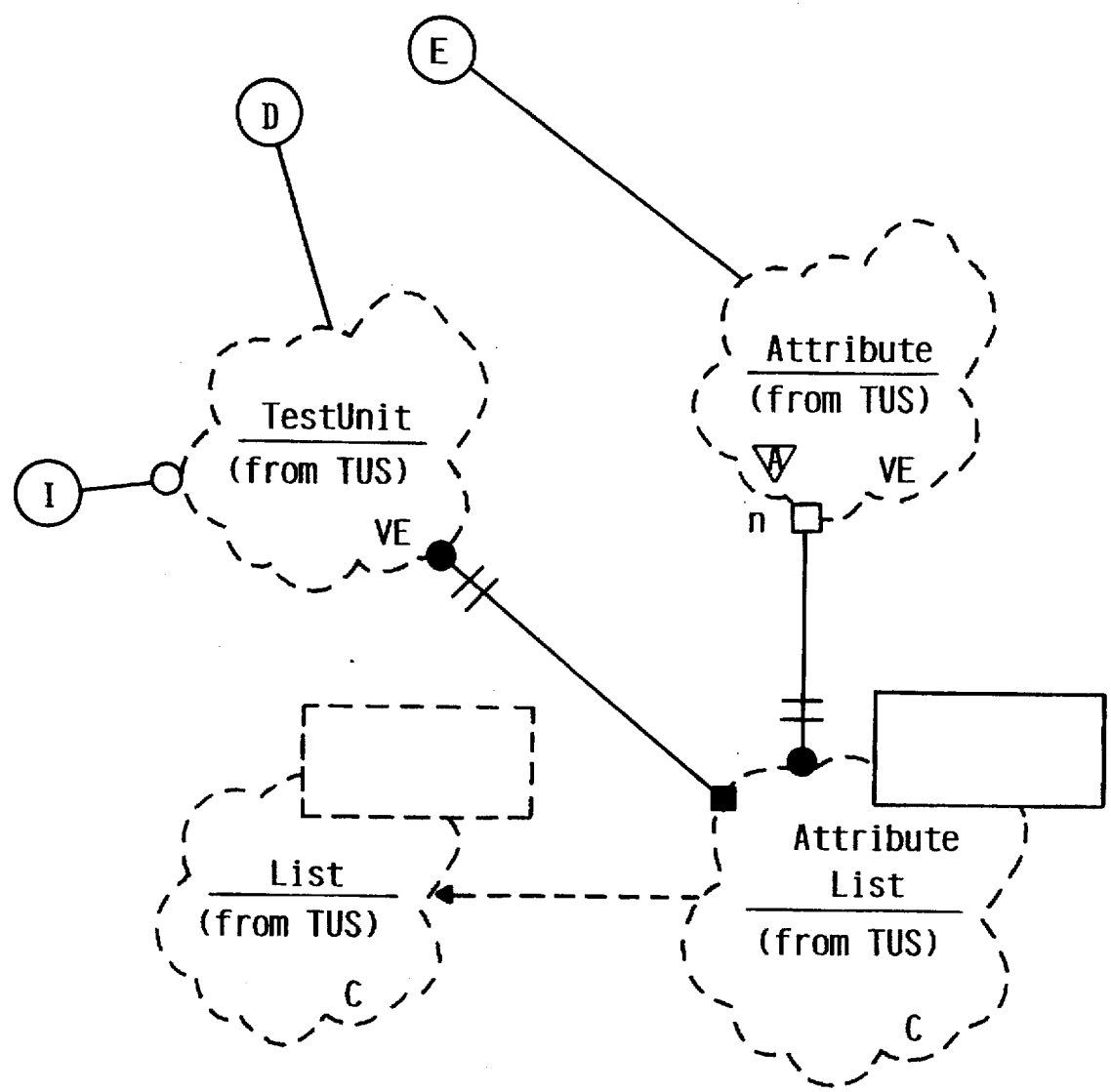
Figure 11D:
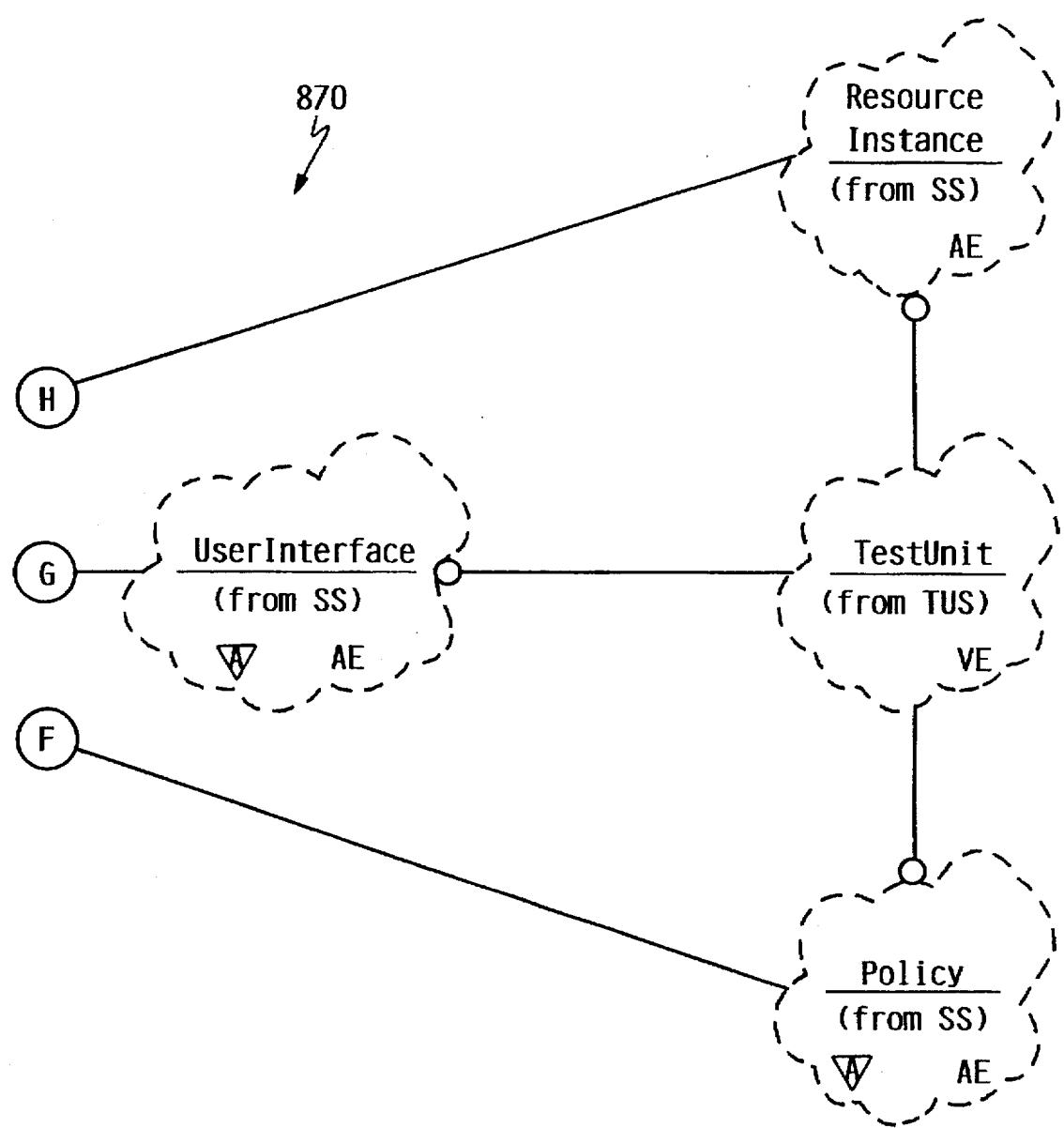

FIG. 10 is a category diagram of the diagnostic framework mechanism 870 in accordance with the present invention. Those skilled in the art will appreciate that the categories illustrated in FIG. 10 represent collections of object oriented programming (OOP) objects that encapsulate data attributes and behaviors (or methods) and are stored in the main memory 820 of computer system 800. These objects may be implemented, for example, in a computer system operating environment that supports the C++ programming language.

The categories of classes have been broken down into three groups: the Script Subsystem (SS), the TestUnit Subsystem (TUS), and the Results Subsystem (RS). These three categories are all extensible (as indicated by the "E" label), meaning that they may be modified by a user of the diagnostic framework mechanism 870. The Script Subsystem has a using relationship with both the TestUnit Subsystem and the Results Subsystem, indicating that the Script Subsystem invokes the methods provided by the classes in these categories. The TestUnit Subsystem has a using relationship with the Results Subsystem, since the TestUnit Subsystem must create or provide suitable test results once the test has been run. Note that these relationships between categories are all core relationships (as indicated by the "C" label), meaning that the framework user cannot modify these relationships.

FIG. 11 is a top level class diagram of the classes used to implement diagnostic framework 870. The categories to which the classes belong are identified by the abbreviations below the class names, with a SS indicating that the class belongs to the Script Subsystem category, a TUS indicating that the class belongs to the TestUnit Subsystem category, and a RS indicating that the class belongs to the Results Subsystem category. Members of the Script Subsystem category include: Script, SubsystemScript, DiagScript, ResourceInstance, UserInterface, and Policy. Members of the TestUnit Subsystem category include: TestUnit, Attribute, AttributeList, and List. Members of the Results Subsystem category include TUResult, Result, ScriptResult, and ServiceAction. The various methods provided in each class are not shown in FIG. 11, but are shown in subsequent figures.

Figure 12A:
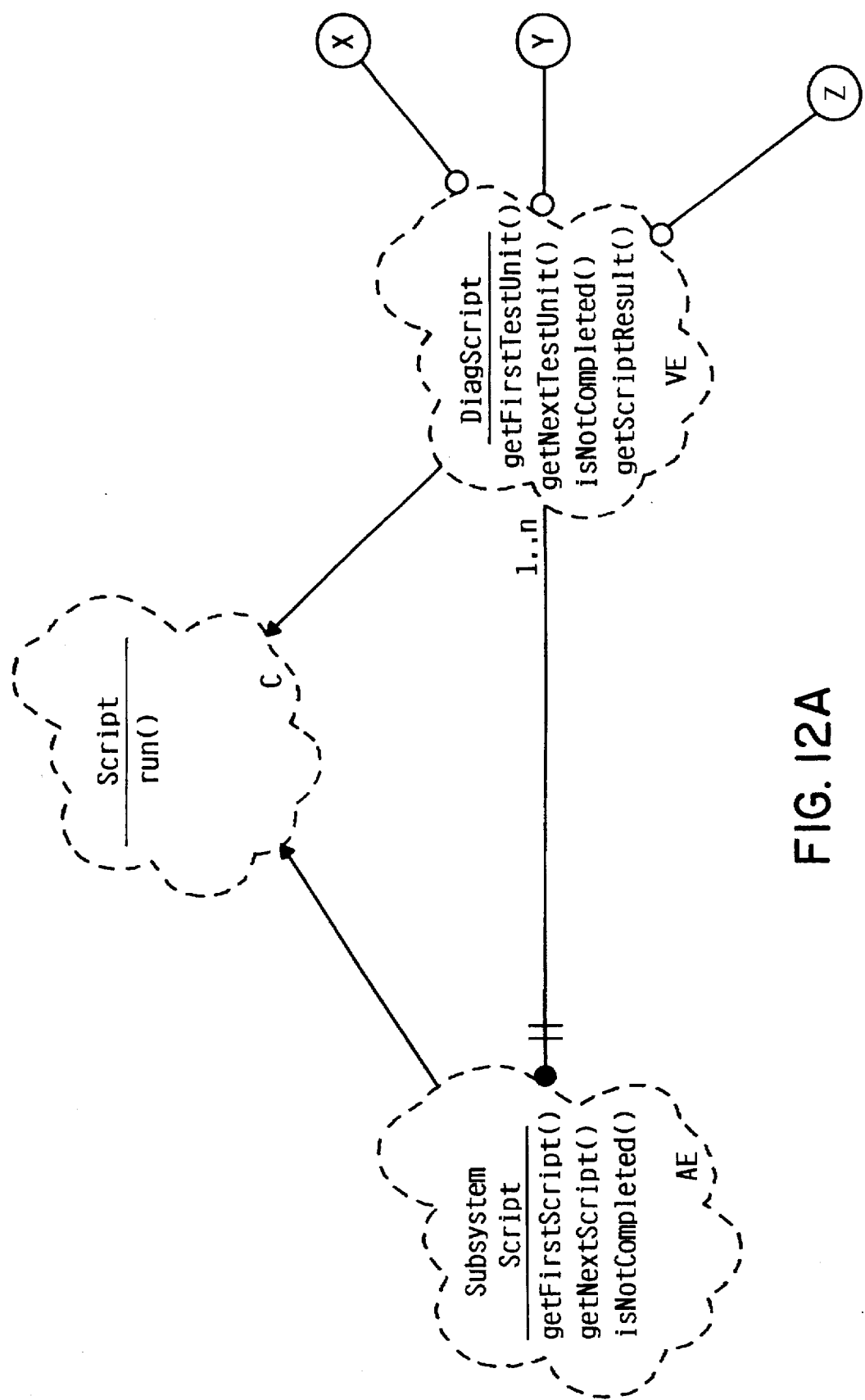
Figure 12B:
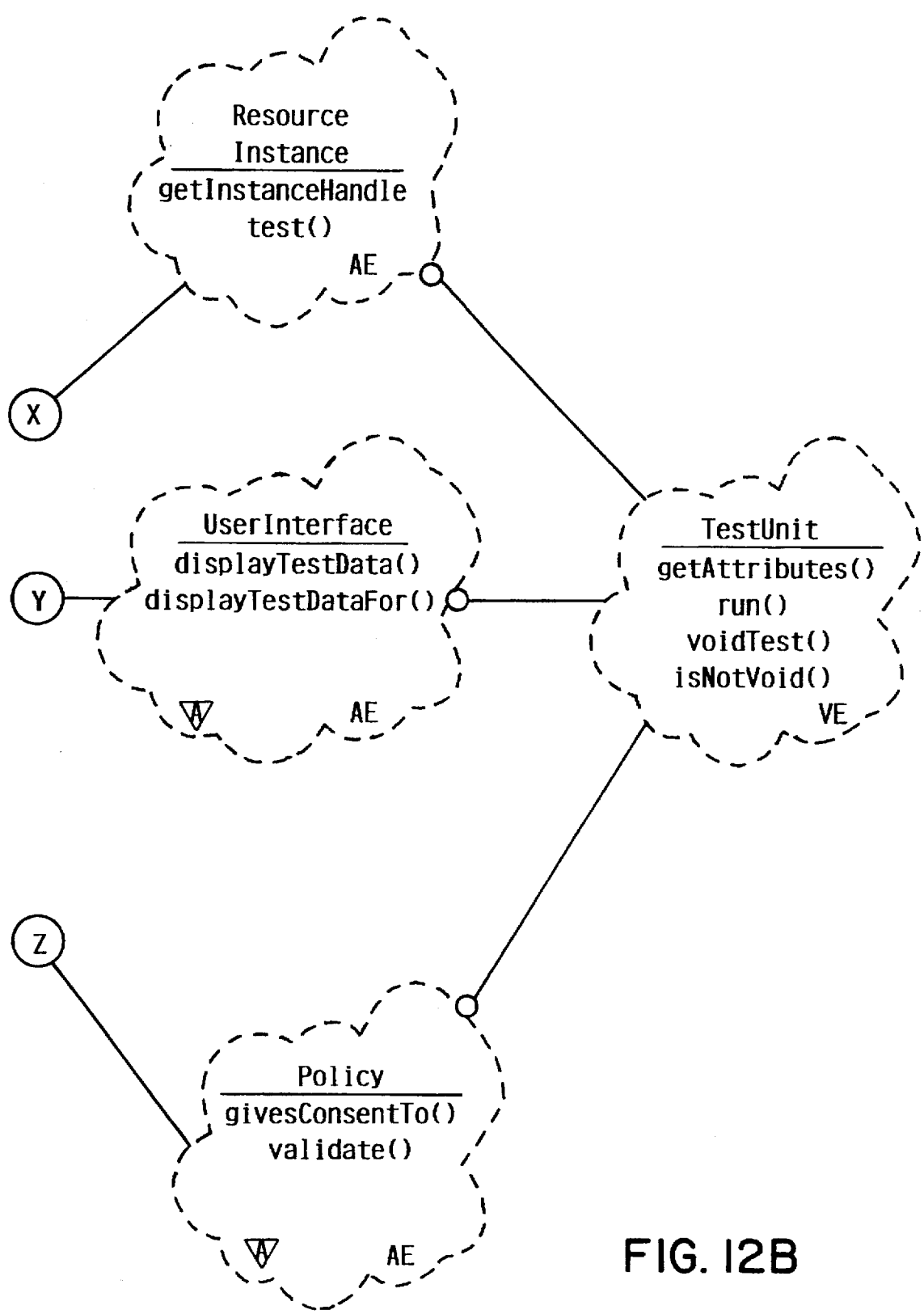

A class diagram of the classes in the Script Subsystem category is shown in FIG. 12. (Note that TestUnit is actually in the TestUnit Subsystem, but is shown here to allow a description of the behavior of the classes in the Script Subsystem category that use the TestUnit.) Both SubsystemScript and DiagScript are subclasses of the Script class, which defines the diagnostic scripts used at the component and subsystem levels. The Script class is a core class of the framework. Thus, objects instantiated under the Script class and the relationships between those objects are considered core characteristics, those that may not be changed by the user of the framework. The Script class defines a run( ) method. When the user wants to begin diagnostic processing of user-supplied scripts, an object invokes the run( ) method of a Script object.

SubsystemScript and DiagScript are subclasses of the Script class. The SubsystemScript class is typically application-extensible (AE)(as shown in the figures), but could also be vendor-extensible (VE) as well. The DiagScript class is vendor-extensible (VE). The Subsystem Script class is defined along with the DiagScript class to allow multiple levels of scripting, i.e., scripts that execute other scripts. The SubsystemScript defines a "has a" relationship with the DiagScript class, meaning that an object instantiated under the Subsystem Script class will have one or more DiagScript objects that compose the Subsystem Script (as indicated by the 1. . . n label on the relationship between the two). The relationship between Subsystem-Script and DiagScript is private (indicated by the two lines on the relationship), meaning that the methods of DiagScript must be called by a SubsystemScript object. The idea behind the SubsystemScript is simple yet extremely powerful; by nesting multiple levels of scripts, multiple diagnostics may be grouped together to test everything from a single subsystem to an entire computer system. For example, the system test script described above that would execute when a computer first powers up could be implemented by nesting. In this example a third type of script, called a SystemScript could be subclassed from Script. It could then define a "has a" relationship with the SubsystemScript. Thus, at the top level, the Script represents a SystemScript which directs SubsystemScripts that, in turn, direct DiagScripts; all in a predetermined order. The SubsystemScript scripts may correspond to subsystems in the computer system, such as the mass storage subsystem or the network subsystem, etc. Each subsystem script may direct the execution of a series of DiagScripts that exercise different portions of hardware and/or software in each subsystem. In the specific example shown in FIG. 12, two levels of scripting are shown, with the DiagScript class representing the scripts the vendor would provide to test vendor-specific hardware and/or software (making the DiagScript class vendor-extensible (VE)), and with the SubsystemScript class containing scripts of the vendor-supplied scripts that would allow the testing of an entire subsystem (making the SubsystemScript class application-extensible (AE)).

Each Script subclass defines a set of extensible methods which provide the means by which each subclass is extended. The SubsystemScript class defines extensible methods getFirstScript( ), getNextScript( ), and isNotCompleted( ); while the DiagScript class defines the methods of getFirstTestUnit( ), getNextTestUnit( ), isNotCompleted, and getScriptResult( ). In operation, invoking the run( ) method on a Script object, actually invokes the behavior defined by the type of subclass the Script object represents; i.e. behavior of a SubsystemScript, DiagScript, etc.

For example, if the Script object represents a SubsystemScript, invoking the run( ) method will invoke the behavior defined to a SubsystemScript. In this instance, the SubsystemScript's behavior is to iterate through it's list of DiagScripts, invoke the run( ) method on each DiagScript, and repeat this process until finished. Each step in the SubsystemScript's behavior or process is carried out by using its extensible methods. Similarly, by invoking the run( ) method on the DiagScript object, each will then, in turn, perform the behavior defined using it's extensible methods, and then return control back to the calling agent; in this case, the SubsystemScript.

Two levels of scripting are illustrated in FIG. 12 to illustrate the basic concepts of nested scripts. In practice, scripts may be nested into any number of levels deep, so long as each higher level script is a subclass of the Script class, and contains methods that: 1) process the first script of the next level, 2) process the next script of the next level, and 3) indicate when the processing of the lower level script is completed. The methods provided by SubsystemScript and DiagScript are the methods for which a programmer will provide implementations. These methods thus provide extensible interfaces that allow a user of the framework to take advantage of the flexibility and power of the diagnostic framework by easily adapting the framework to new or different diagnostic tests. The specific implementation shown in the figures for the DiagScript class and the SubsystemScript class are shown for the purpose of illustration, and a framework designer may select alternative implementations (e.g., methods) within the scope of the present invention.

The ResourceInstance class is an application-extensible (AE) class. ResourceInstance includes methods getInstanceHandle( ) and test( ). DiagScript has a using relationship with ResourceInstance, since DiagScript calls the test( ) method of ResourceInstance. This allows the ResourceInstance to determine which instance of a particular type of resource needs to be tested, if more than one exists on a system. An instance handle in this context is simply a unique identifier that distinguishes among different instances of the same resource. For example, if there are two hard disk drives in a computer system that are the same model, each will be assigned a different instance handle to uniquely identify one from the other. The DiagScript passes the TestUnit to the ResourceInstance as an argument on the test( ) method. The ResourceInstance's test( ) method obtains the appropriate instance handle, by invoking its getInstanceHandle( ) method, and passes it to the TestUnit as an argument on the run( ) method. The TestUnit must then use the instance handle to determine which resource instance to test.

The Policy class is an application-extensible (AE) class, and provides the methods givesConsentTo( ) and validate( ). Policy is an abstract class, meaning that no instances of Policy are ever created, but Policy serves to define common interfaces for its subclasses. For each TestUnit obtained by the DiagScript object, by either the getFirstTestUnit( ) or the getNextTestUnit( ) method, the validate( ) method of Policy is called to determine whether the test unit at issue may be run. Policy provides the capability to decide whether or not certain tests should be performed. For example, if a failure occurs in a floppy disk drive subsystem on a computer system that has no operator present, it would be inappropriate to run a test unit that requires an operator to install a blank floppy into the disk drive. In this case, invoking the validate( ) method on a Policy object causes the getAttributes( ) method of TestUnit to be called to determine the attributes of the TestUnit. The list of attributes corresponding to the particular TestUnit are returned to the Policy by the invoking the getAttributes( ) method on the TestUnit at issue. These attributes are passed to the givesConsentTo( ) extensible method which will identify those attributes which may conflict with the environmental constraints of the application. If any of the TestUnit's attributes conflict with any of the application's environmental constraints, then the Policy voids the test using the voidTest( ) method on the TestUnit. For example, in the floppy disk drive example above, if the TestUnit object requires user interaction, this will be reflected in the attribute list returned by the getAttributes( ) method. The attributes of the TestUnit object are then compared with the attributes of the application's policy via the givesConsentTo( ) method in order to make a decision of whether or not to proceed with performing the test represented by the TestUnit object. If the attributes of the system are not compatible with the attributes of the TestUnit, the Policy object invokes the voidTest( ) method to indicate that the TestUnit in question cannot be run.

TestUnit defines a class of objects that represent all the different individual tests that need to be performed when executing a diagnostic script. A diagnostic may be defined as an ordered set of primitive tests designed or compiled to perform problem isolation for a particular resource. In the context of the diagnostic framework of the present invention, the DiagScript is the diagnostic and the TestUnits are the primitive tests. In the preferred embodiment, a single primitive test is implemented within a single TestUnit. Note, however, that this is a matter of design choice, and it is within the scope of the present invention to implement multiple primitive tests within a single TestUnit. In addition, the specific implementation of the TestUnit class and corresponding objects in the figures is shown for the purpose of illustration, and alternative implementations fall within the scope of the present invention as long as they provide one or more tests that may be performed by calling a one of their methods.

TestUnit is a vendor-extensible (VE) class, and provides the methods getAttributes( ), run( ), voidTest( ), and isNotVoid( ). Each TestUnit object has a corresponding list of attributes that describe the various features or characteristics that may conflict with the diagnostic application's policy. The attributes for a specific TestUnit object are retrieved using the getAttributes( ) method for that object. The attributes allow the Policy to make decisions regarding whether or not the test represented by the TestUnit object should be run.

UserInterface is an application-extensible (AE) class that provides the displayTestData( ) and displayTestDataFor( ) methods. UserInterface is also an abstract class, which provides another extensible interface, allowing an application programmer to implement specific subclasses that contain the needed methods for a particular type of user interface. Calling displayTestDataFor(TestUnit) results in calling the getAttributes( ) method of the TestUnit object. The attributes list for TestUnit is passed to the displayTestData( ) method, thereby identifying the attributes of the test so the UserInterface object will know the appropriate information to display for the test and the appropriate user interaction required (if any).

ResourceInstance, UserInterface, and Policy all have a using relationship with TestUnit. TestUnit passes its attribute list to UserInterface and Policy, and executes its test when ResourceInstance calls the run( ) method in TestUnit. All the classes shown in FIG. 12 are members of the Script Subsystem category, with the exception of TestUnit, as mentioned above.

Figure 13:
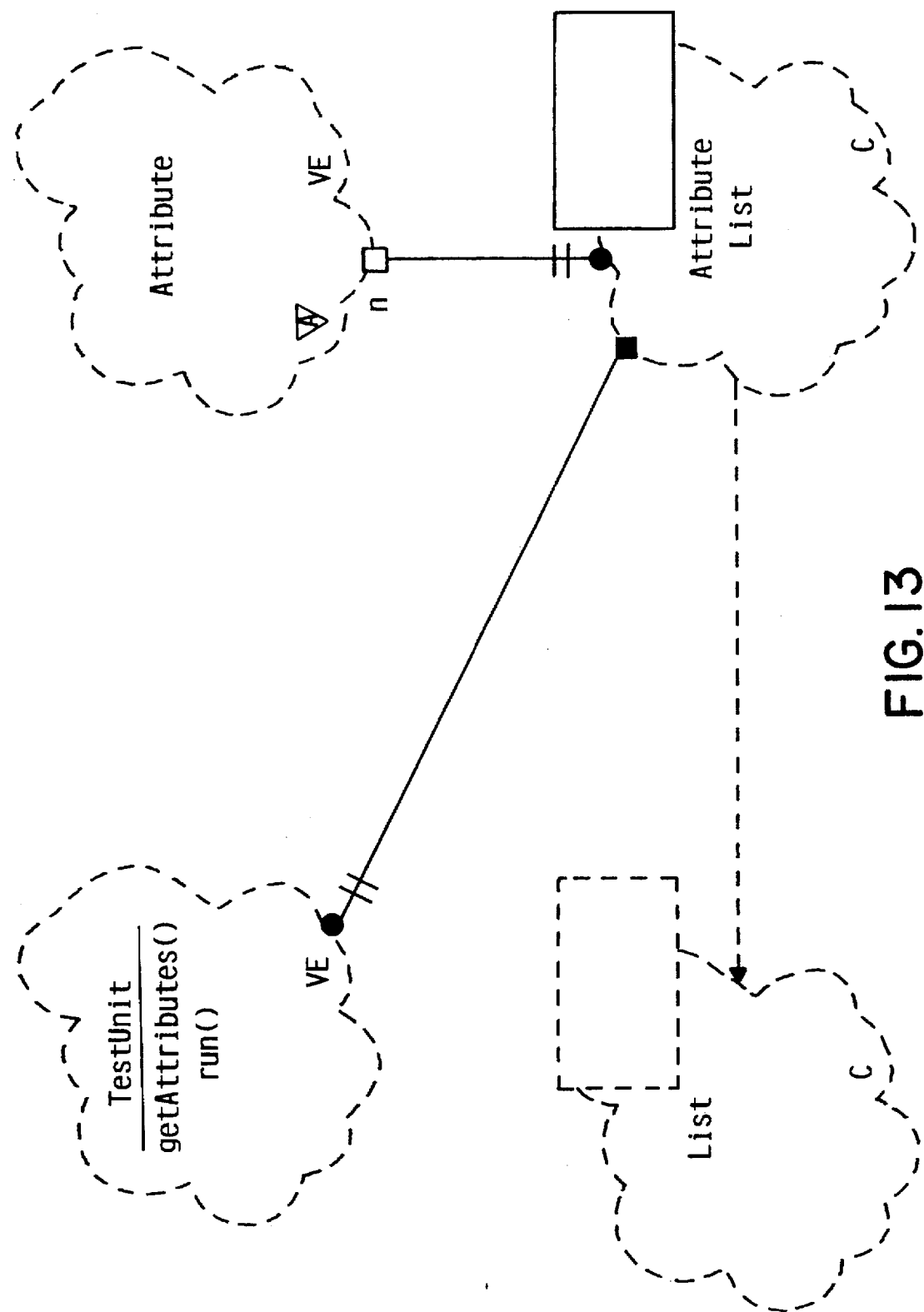

FIG. 13 illustrates the relationships of classes in the TestUnit Subsystem category. As previously described, TestUnit is a vendor-extensible (VE) class that contains the two methods shown. TestUnit is the class that a programmer for a vendor will use to implement a specific diagnostic test for their product. TestUnit has a "has by value" relationship to AttributeList, indicating that a TestUnit object will contain a list of its attributes. AttributeList is a parameterized instantiation of the List template class, and has a "has by reference" relationship with the Attribute abstract class. Note that AttributeList and List are core classes, while Attribute and TestUnit are vendor-extensible (VE) classes. Any number of attributes may exist in an attribute list, as denoted by the "n" label near the class relationship between Attribute and AttributeList. In essence, List is a container type of class, Attribute is a type of element that may exist in a list container, and the parameterized instantiated class AttributeList is thus a class that is defined as a list that contains objects of the type Attribute for the TestUnit.

Figure 14:
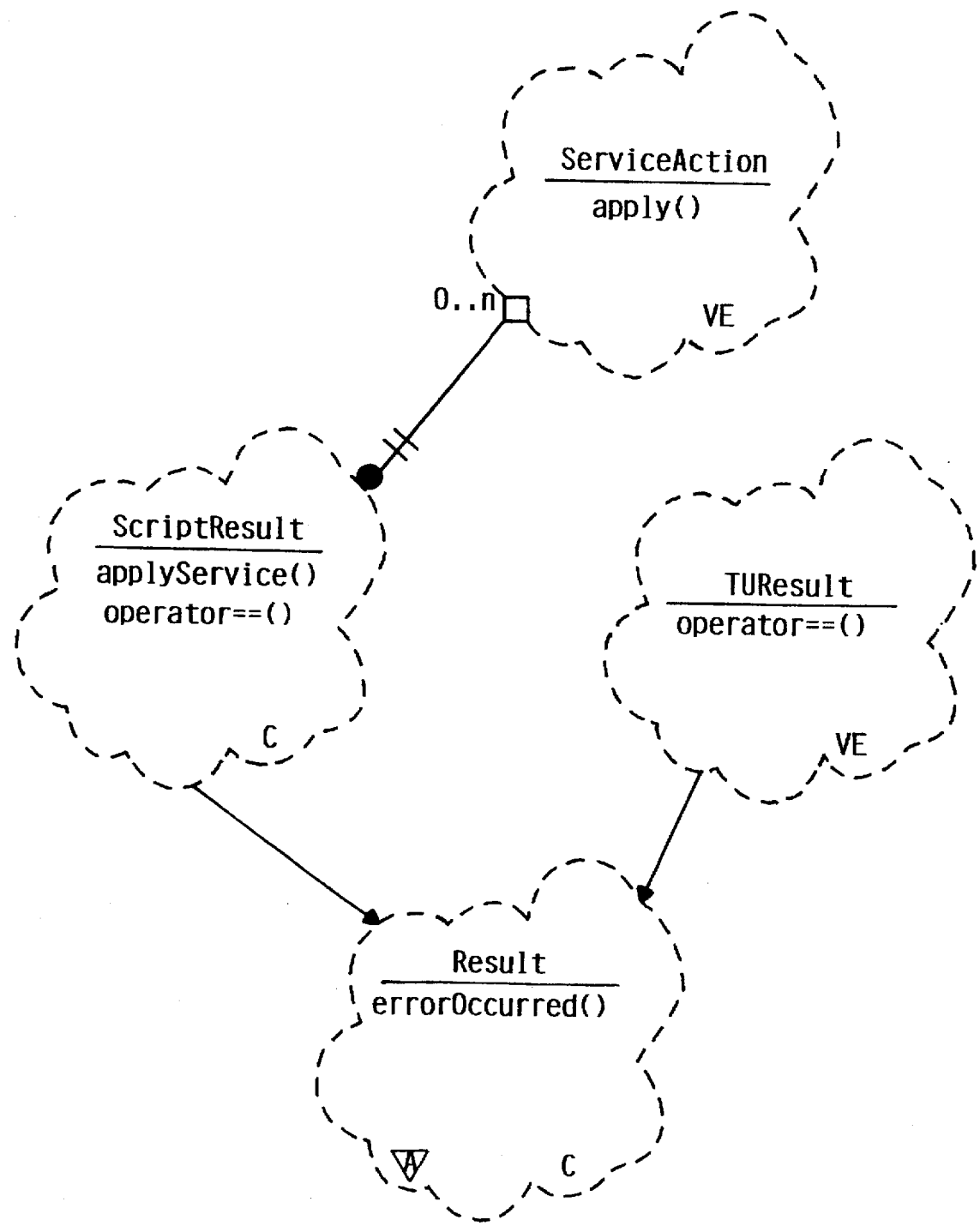

The classes that belong to the Results Subsystem are shown in the class diagram of FIG. 14, and include: ServiceAction, ScriptResult, Result, and TUResult. The ScriptResult and Result classes are core classes, while the ServiceAction and TUResult classes are vendor-extensible (VE) classes. The design of these classes allows a client to determine that an error occurred when the run( ) method of a TestUnit object was called without requiring a knowledge of exactly what type of error occurred. When a TestUnit has finished processing (i.e., has performed its tests), the operator==( ) method of the TUResult class is called to determine the results of the test. If a TUResult indicates an error, this result can be used to help identify the type of service action needed to correct the problem discovered using the operator==( ) method with predefined TUResult objects that are associated with ServiceAction objects. This operator==( ) method also aids in determination of the next action or TestUnit to run via another set of predefined TUResult objects that are associated with action identifiers. Any ServiceActions that are identified are contained within the ScriptResult object. The ScriptResult object is returned to the calling agent of the run( ) method on the DiagScript object. The calling agent can then invoke the errorOccurred( ) method to determine if the diagnostic discovered a problem. The calling agent may also use the operator==( ) method to compare against predefined ScriptResults. The applyService( ) method may then be invoked by the calling agent which will then invoke the apply( ) method on all ServiceAction objects contained within. A service action for the purposes herein has a very broad meaning, and can encompass any action that is taken as a result of encountering an error during the diagnostic processing. Examples of appropriate service actions include: performing additional tests to further pinpoint a failure, notifying an operator of a failure, logging the failure to a report, placing a telephone call to a service center to request a service call, bypassing the failure by using an alternative redundant component, etc. The class relationships in the Results Subsystem category simply define a way for performing appropriate actions when an error is encountered in TestUnit, without requiring that the diagnostic application understand the nature of the error. While a specific implementation for the classes in the Results Subsystem has been provided in the figures, this is for illustration only, and other alternative implementations for determining the result of a test is within the scope of the present invention. By providing appropriate implementations of ServiceAction and TUResult, vendors may customize a diagnostic routine to take appropriate service actions when errors are encountered without giving the framework the knowledge of the specific tests performed, errors encountered, or service action required.

An example will now be presented to illustrate how a diagnostic application may be constructed using the diagnostic framework disclosed herein. For the sake of clarity, the function of the diagnostic application will be described conceptually, followed by an example of how these concepts may be implemented using the object oriented diagnostic framework of the present invention to achieve the desired diagnostic application.

Figure 15:
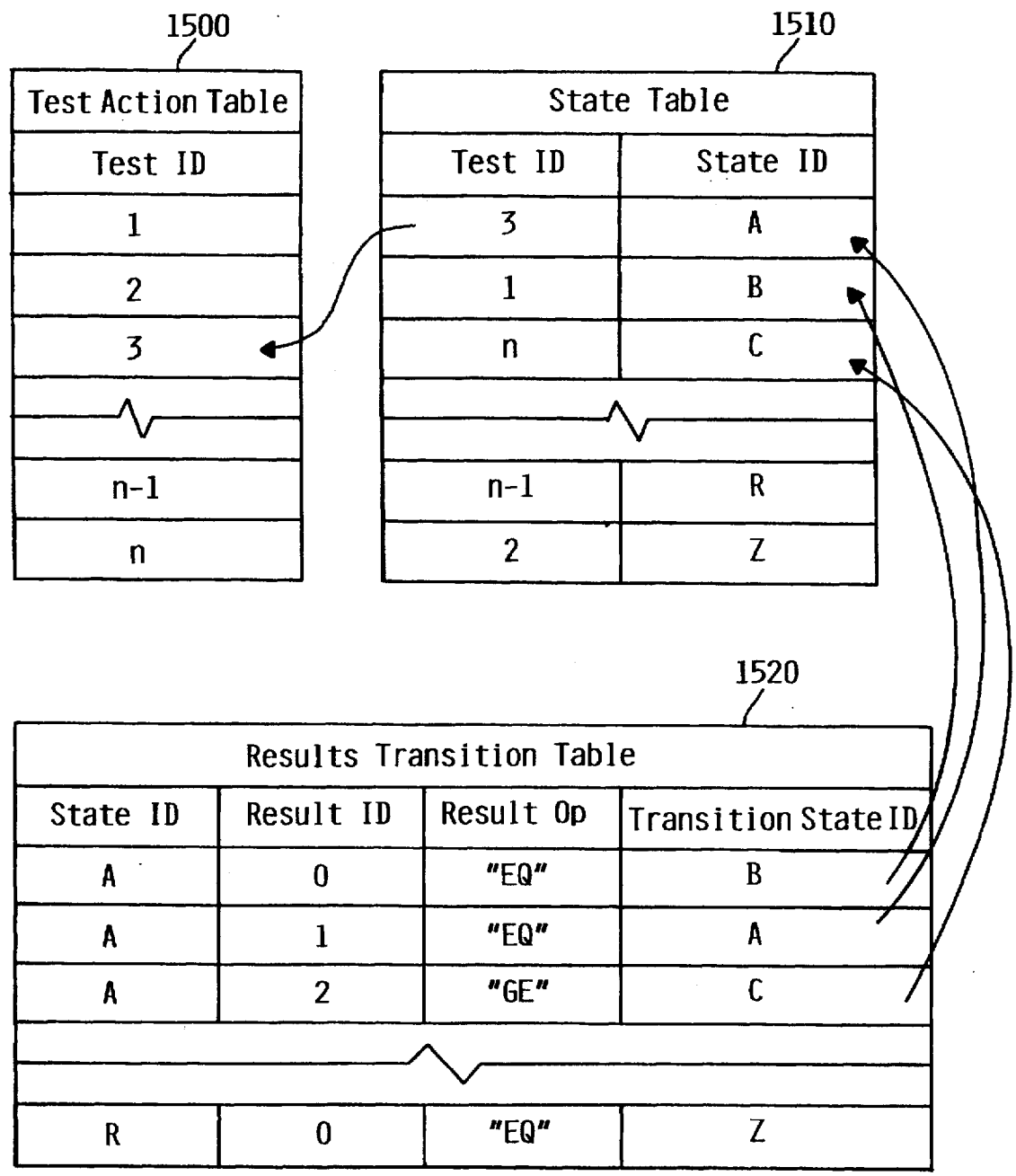
FIG. 15 is a table illustrating diagnostic scripting methods in accordance with the present invention.

Referring now to FIG. 15, a sample diagnostic application that uses scripting techniques is disclosed using three tables, a test action table 1500, a state table 1510, and a results transition table 1520. Test action table 1500 contains entries that provide all necessary information for performing a set of distinct test actions. At a minimum, each entry in test action table 1500 must include a test identifier (Test ID in FIG. 15), but may also include other information pertinent to the implementation such as a test name, a test description, prerequisite test, prerequisite conditions, test locations, etc.

State table 1510 provides the mechanism by which the diagnostic application can determine which test action to perform. Each entry in state table 1510 contains a state identifier and a test action identifier, and may optionally include state specific test information such as a pre-test user dialog message or a test loop count indicator. For the specific example shown in FIG. 15, state table 1510 contains only two fields per entry, one for the test identifier (Test ID) and the other for the state identifier (State ID).

Results transition table 1520 provides information pertinent to obtaining failure information and making appropriate state transitions. Each entry in results transition table 1520 is keyed by a state identifier (State ID) and a result identifier (Result ID), and contains a results comparison operator (Result Op) and the transition state identifier (Transition State ID). The results comparison operator allows identification of specific pre-known results, result groups or ranges, and even unexpected results. Each entry in results transition table 1520 may also contain a post-test user dialog message, recommended service action information, and failing item information. Additionally, to support nested scripting, an optional script name may accompany the transition state identifier in the results transition table entry.

The diagnostic application that uses these three tables 1500, 1510 and 1520 becomes a dedicated interpreter of diagnostic scripts, following a specific script format and then performing the identified test at each test state. The diagnostic application utilizes the table by selecting the first entry in the state table to start, performs the test action, gathers appropriate failure information from the results transition table, and then uses the transition state identifier obtained from the results transition table to select the next state. Thus, instead of the traditional approach where a diagnostic application has intimate knowledge of all failure diagnostics, the diagnostic application discovers necessary information about diagnostics via available diagnostic scripts.

The diagnostic application would start with the first entry in state table 1510, which contains a test identifier of 3. The application would then proceed to perform the diagnostic tests called for by test 3 in test action table 1500. The state identifier in state table 1510 corresponding to the first entry is then used as an index into results transition table 1520. The application evaluates the result identifier and the result operator for the entries into results transition table 1520 that match the state identifier in state table 1510. Thus, for test 3, only those entries in results transition table 1520 that have a state identifier of A would be considered. When the application determines which entry in results transition table 1520 matches the results of the test the diagnostic just performed, the transition state identifier of that entry contains the state designator for the next test to be performed. Thus, if test 3 returns a result identifier equal to zero (Result Op=EQ and Result ID=0), the transition state identifier is B, which corresponds to test identifier one in state table 1510. Thus, the next test would be test 1 (from test identifier 1 in state table 1510 corresponding to state identifier B). If test 3 returns a result identifier equal to one (Result Op=EQ and Result ID=1), the transition state identifier is A, so the next test would be test 3 (again). In this manner, the script can force itself to loop during testing until a test can be completed and can return a result identifier that indicates completion of the test. If test 3 returns a result identifier greater than or equal to two (Result Op=GE and Result ID=2), the transition state identifier is C, so the next test would be test C. This method of processing the diagnostic scripts in these tables 1500, 1510 and 1520 continues until the end of the state table 1510 is reached or until a diagnosis is obtained.

The sample diagnostic application illustrated by the tables in FIG. 15 may be implemented using an object oriented diagnostic framework in accordance with the present invention. Such an implementation is illustrated in the class diagram of FIG. 16 and the object diagrams of FIGS. 17–22. The classes TUResult, DiagScript, ServiceAction, TestUnit, and Attribute are the vendor extensible (VE) classes in the 'framework. To take advantage of the framework, the programmer simply defines subclasses of each of these vendor-extensible (VE) classes to implement the specific tasks performed by each. For example, VendorTUResult is a subclass of TUResult, VendorTestUnit is a subclass of TestUnit, VendorAttribute is a subclass of Attribute, and VendorScript is a subclass of DiagScript. These subclasses, through inheritance, have the same methods defined as their superclasses, and may have additional methods defined as well. Note that the methods of the superclasses are not shown in FIG. 16, but only the additional methods defined by the subclasses are shown. It should be understood that each subclass includes all methods of its superclass.

A paramaterized class called Map is also defined by the vendor, which provides a template class for table-like structures. The TUResultsMap, ServiceMap, and ScriptMap are all parameterized instantiations of the Map class, which provides methods getFirst( ), getLast( ), and operator[ ]( ). VendorScript is a subclass of DiagScript, and therefore provides the methods of getFirstTestUnit( ), getNextTestUnit( ), isNotCompleted( ), and getScriptResult( ), in addition to the methods retrieveStateEntryHandle( ) and saveStateEntryHandle( ), which are unique to the VendorScript subclass. When a VendorScript is to be processed, the getFirstTestUnit( ) on the VendorScript object is called. In response thereto, the getFirst( ) method of ScriptMap is called, which causes ScriptMap to identify a TestUnit that corresponds to the first test unit. ScriptMap then calls the createNew( ) method on TUFactory, which creates the desired test unit by instantiating an object and populating it with the appropriate attributes for that test unit. TUFactory is a metaclass (as indicated by the shaded cloud) that instantiates each test unit as directed by the ScriptMap object. The ScriptMap class is defined in a way that corresponds to state table 1510 of FIG. 15. Just as state table 1510 provides a corresponding test identifier for each state identifier, ScriptMap provides the same function, producing a test identifier that indicates to TUFactory which test unit needs to be instantiated. TUFactory, then, corresponds to test action table 1500 of FIG. 15, instantiating an appropriate test unit object (i.e., identifying an appropriate test) depending on the test identifier passed by ScriptMap (i.e., depending on the test identifier in table 1510). The function of the results transition table 1520 of FIG. 15 corresponds to the function of TUResultsMap in FIG. 16. When a test is completed, TUResultsMap passes the result of the test to ScriptMap so ScriptMap can determine the next test unit that needs to be created. This is very similar to the function of results transition table 1520, which produces the next state identifier based on the result of the previous test. Note that a new class ScriptEntryHandle is also defined with a method isEndOfScriptHandle( ) which serves to monitor each entry in the ScriptMap object and TUResults object to determine if the entry being processed is the last entry in the script. This method isEndOfScriptHandle( ) serves as an indicator that the last test unit has been processed. In the particular implementation illustrated in the figures, it is assumed that the first test unit is defined or marked (i.e., is recognizable as the first test unit), and that the last test unit is also defined or marked (i.e., is recognizable as the last test unit). ScriptEntryHandle defines a isEndOfScriptHandle( ) (i.e., a last TestUnit indicator) method that the VendorScript uses to monitor each entry in the script to determine when the script has completed. Note that there may be many different entries in ScriptMap that are marked with the EndOfScriptHandle, since the test may need to terminate at a number of different points depending on the results of each test that is performed.

Core Function

FIG. 11 best distinguishes between core and extensible classes in the diagnostic framework of the present invention. Specifically, as noted above, the following classes are core classes: Script, ScriptResult, Result, List, and AttributeList. The rest of the classes in FIG. 11 are extensible, either by application programmers (AE) or by vendors (VE). Note that all class relationships shown in FIG. 11 are core relationships, and may not be modified by the user of the framework. In fact, it is the fixed character of these relationships between classes that defines the core function of a framework and makes it useful and powerful. The core function of the diagnostic framework is defined by the core classes and class relationships, along with functional requirements that cause the framework to behave in the desired manner. As described above with respect to FIG. 9, the overall core function of the diagnostic framework includes the steps of method 900.

Object Interaction

Figure 16A:
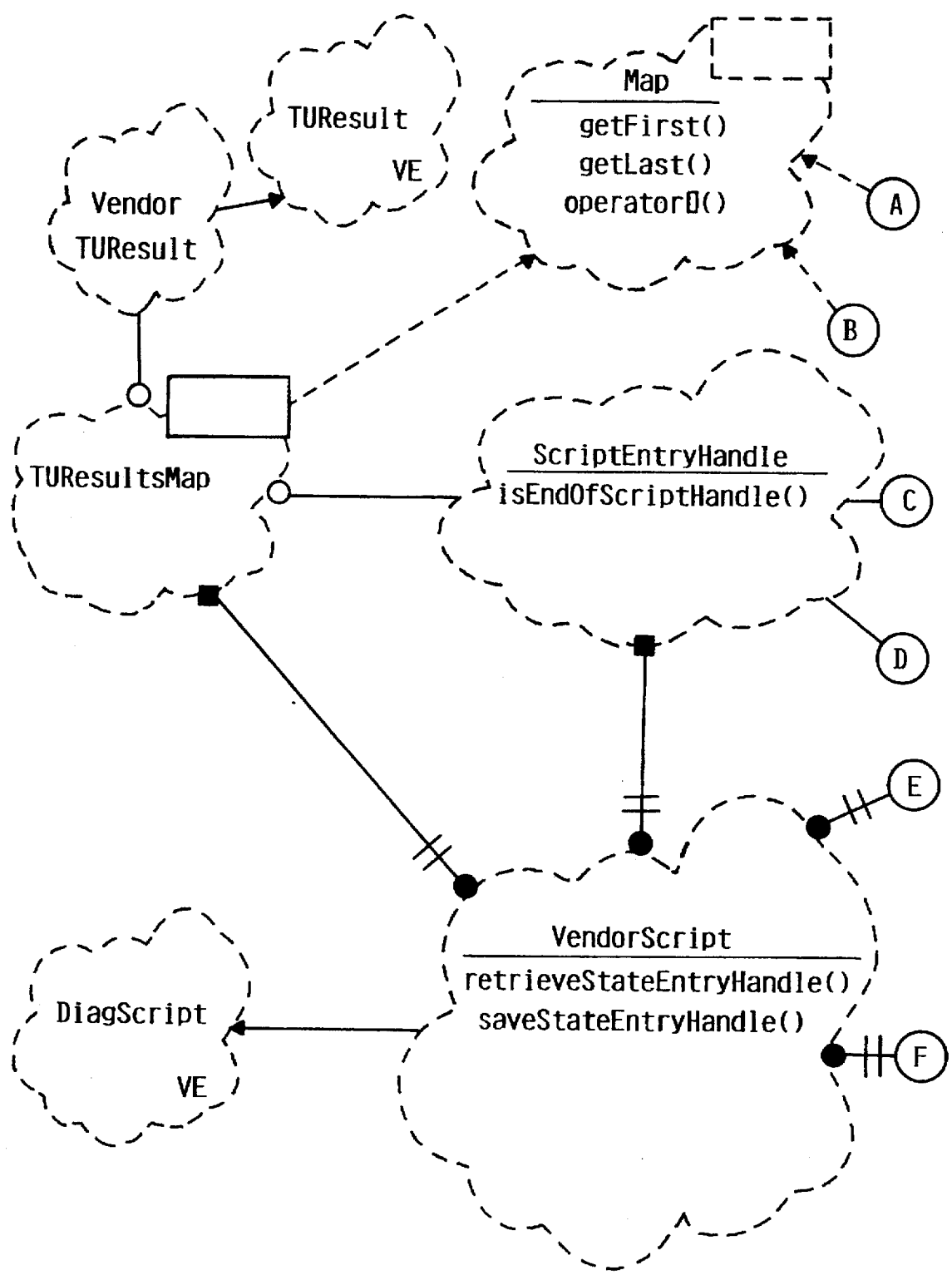
Figure 16B:
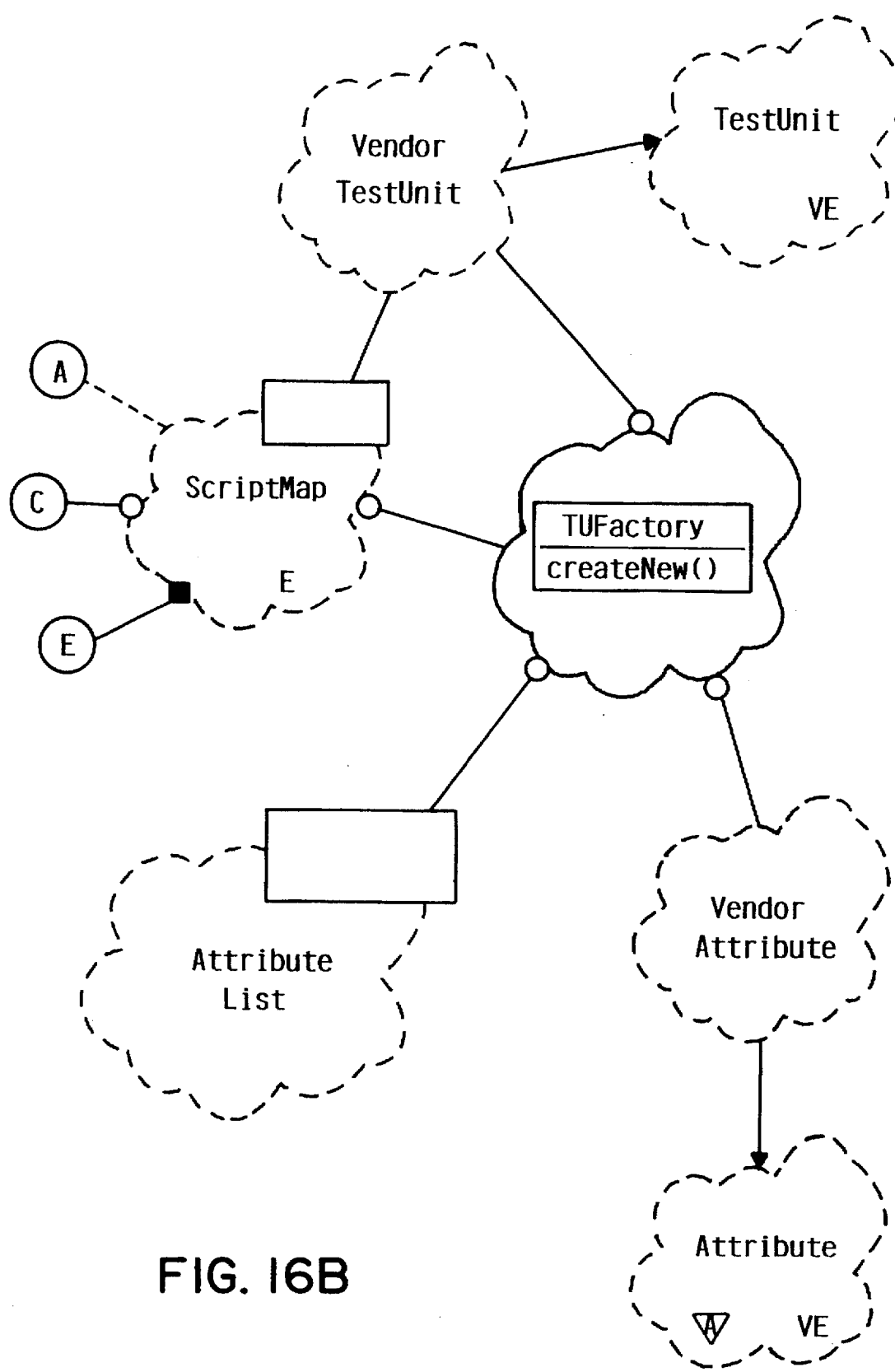
Figure 16C:
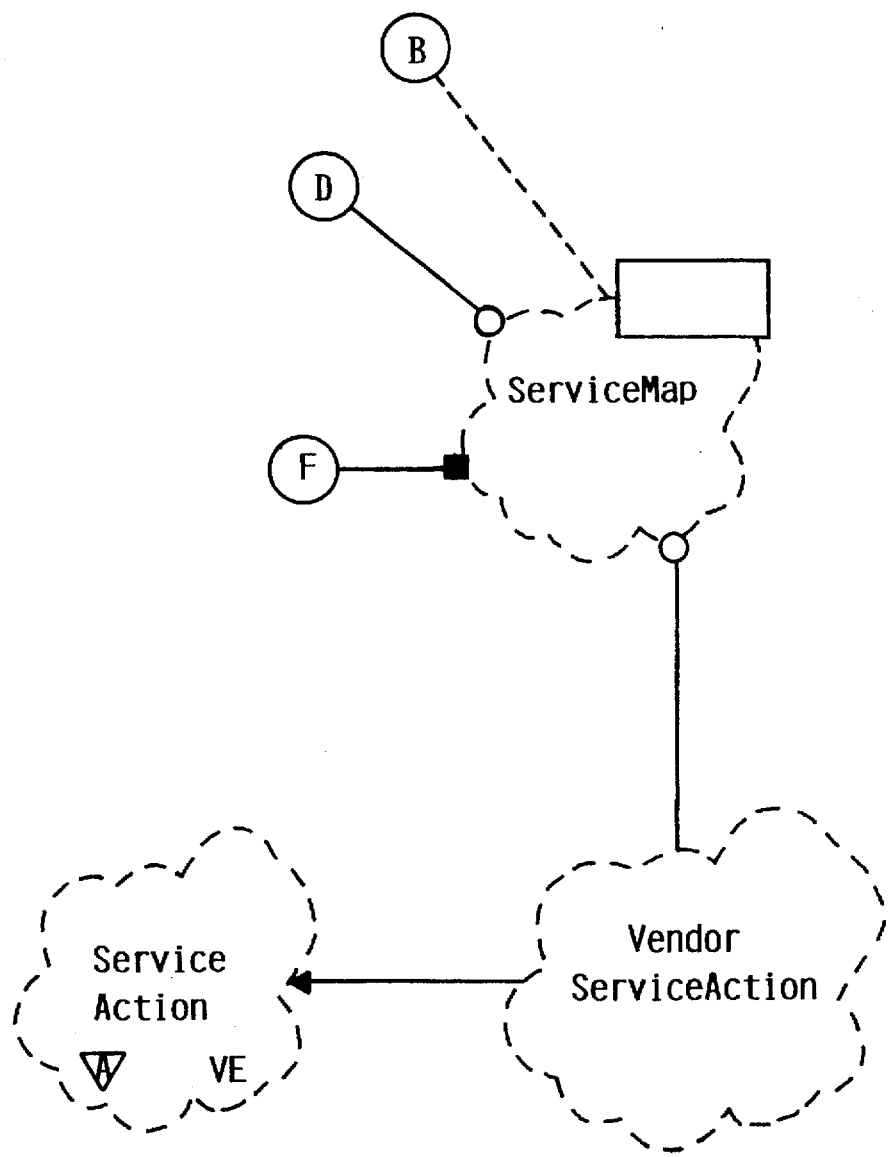
Figure 17A:
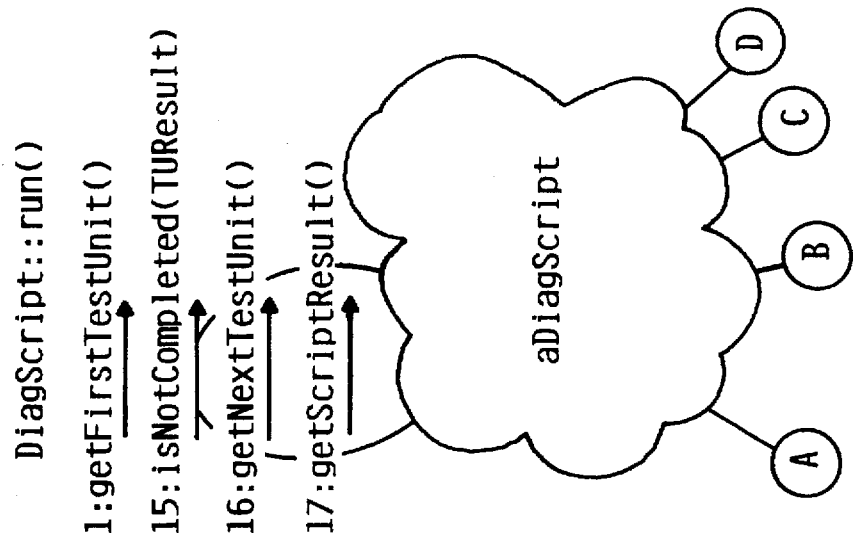
FIGS. 17–22 are object diagrams of a framework mechanism constructed in accordance with the teachings of the present invention.
Figure 17B:
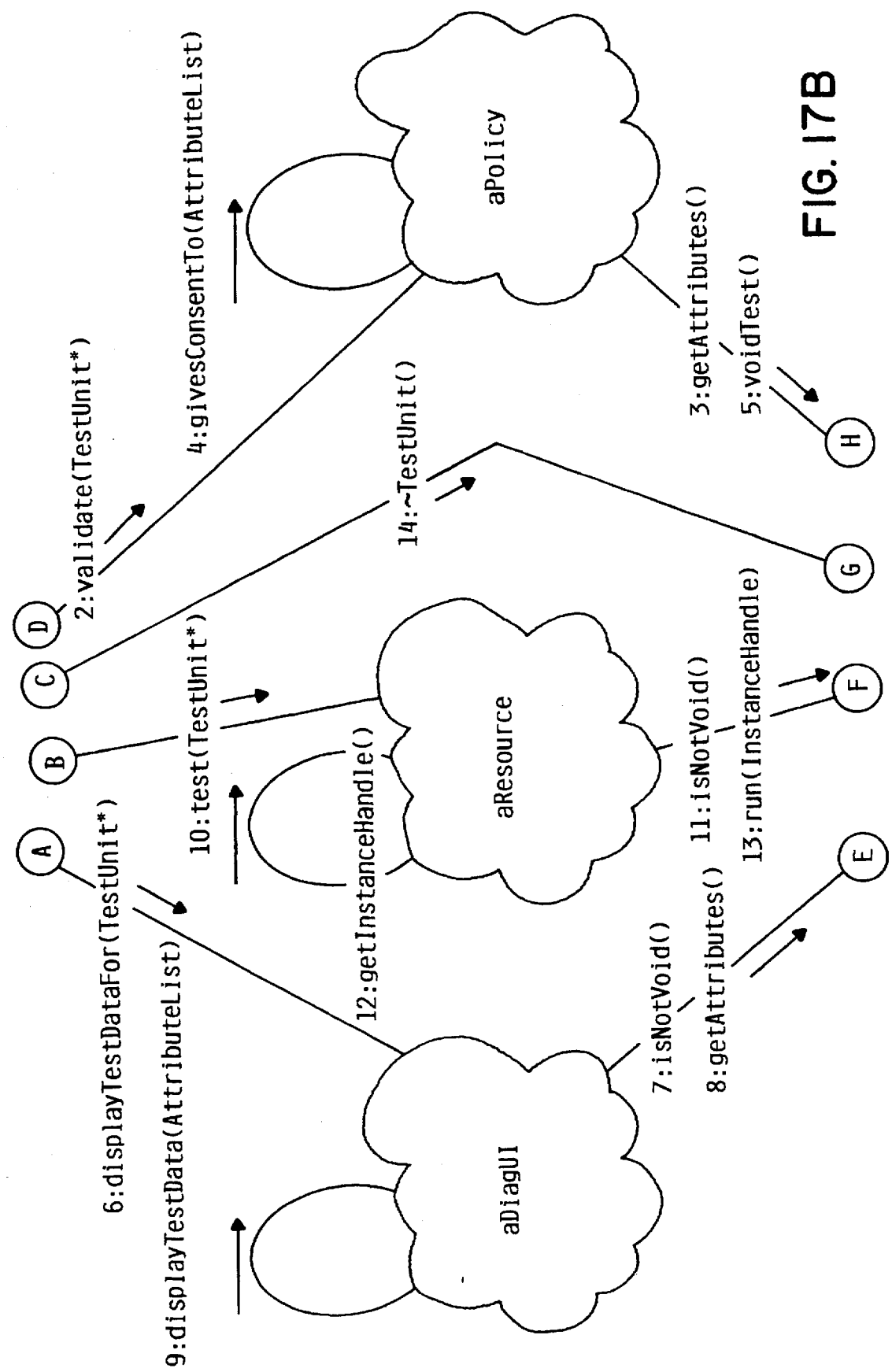
Figure 17C:
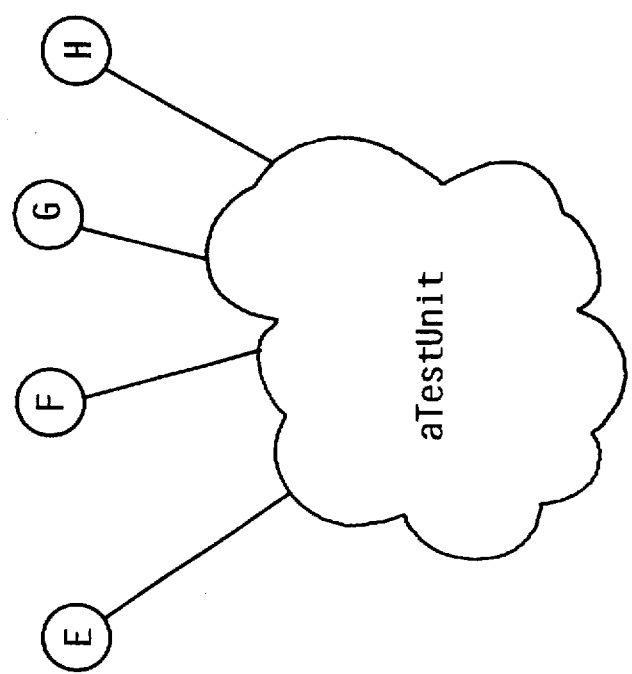
Figure 18A:
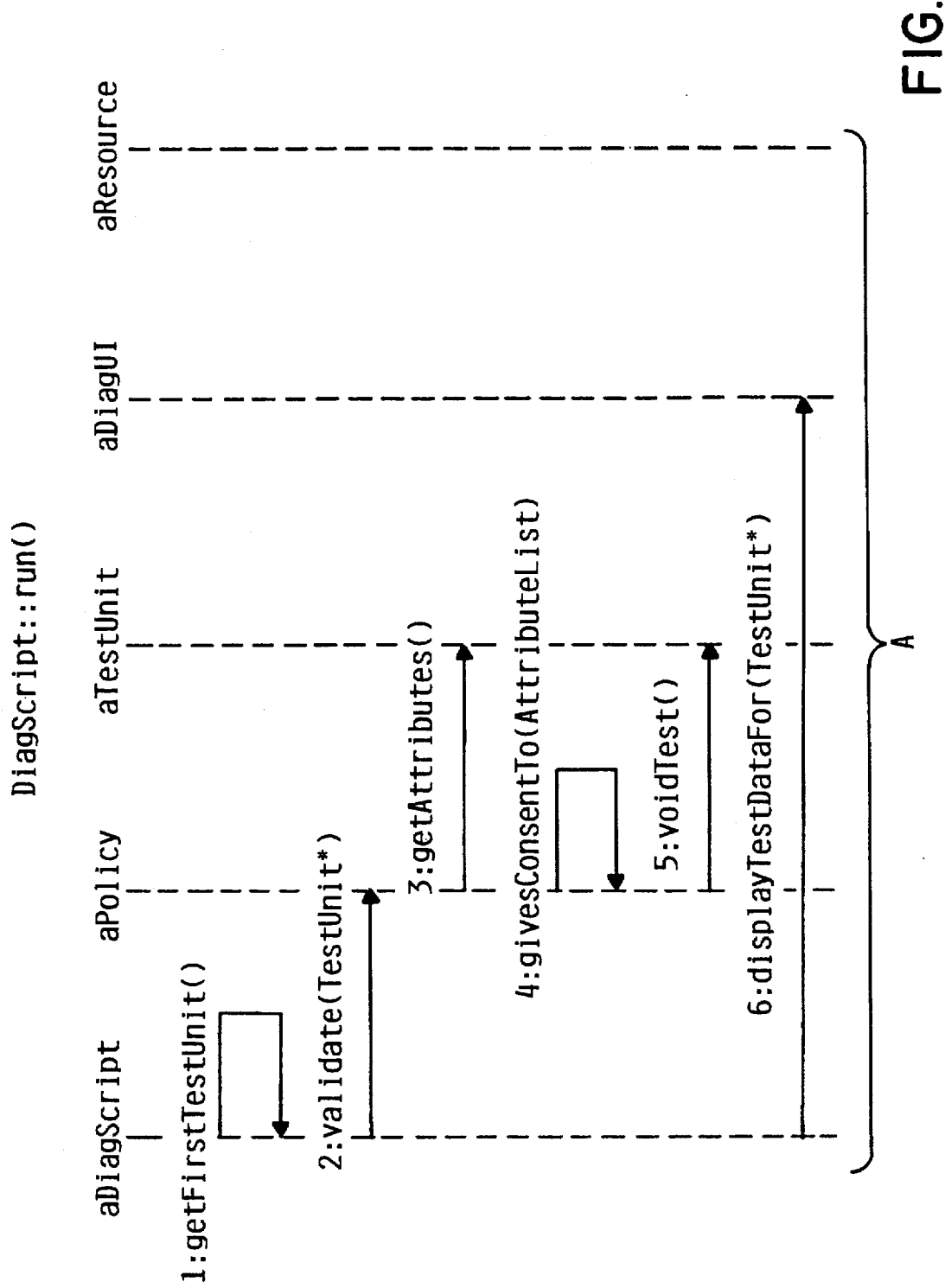
Figure 18B:
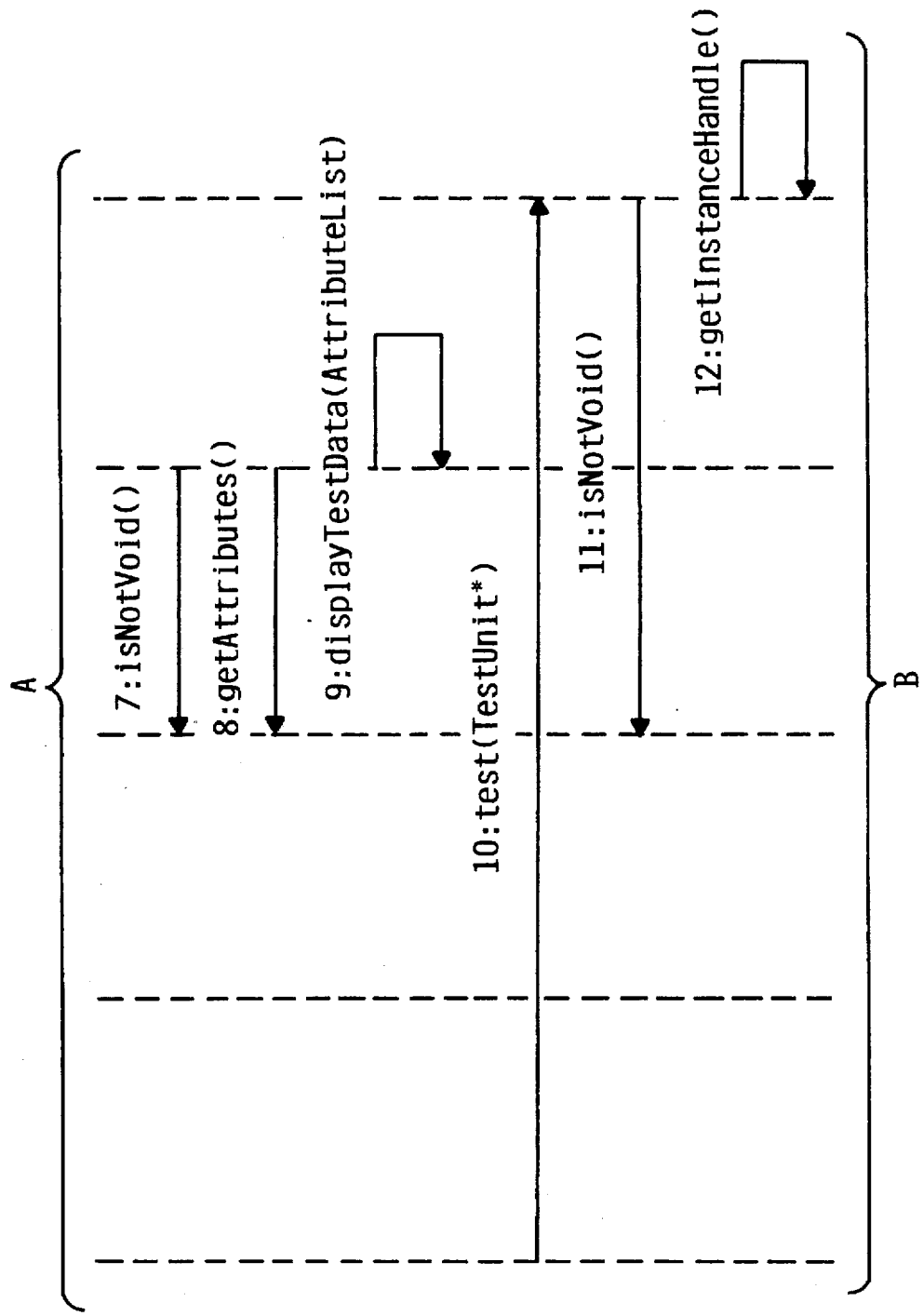
Figure 18C:
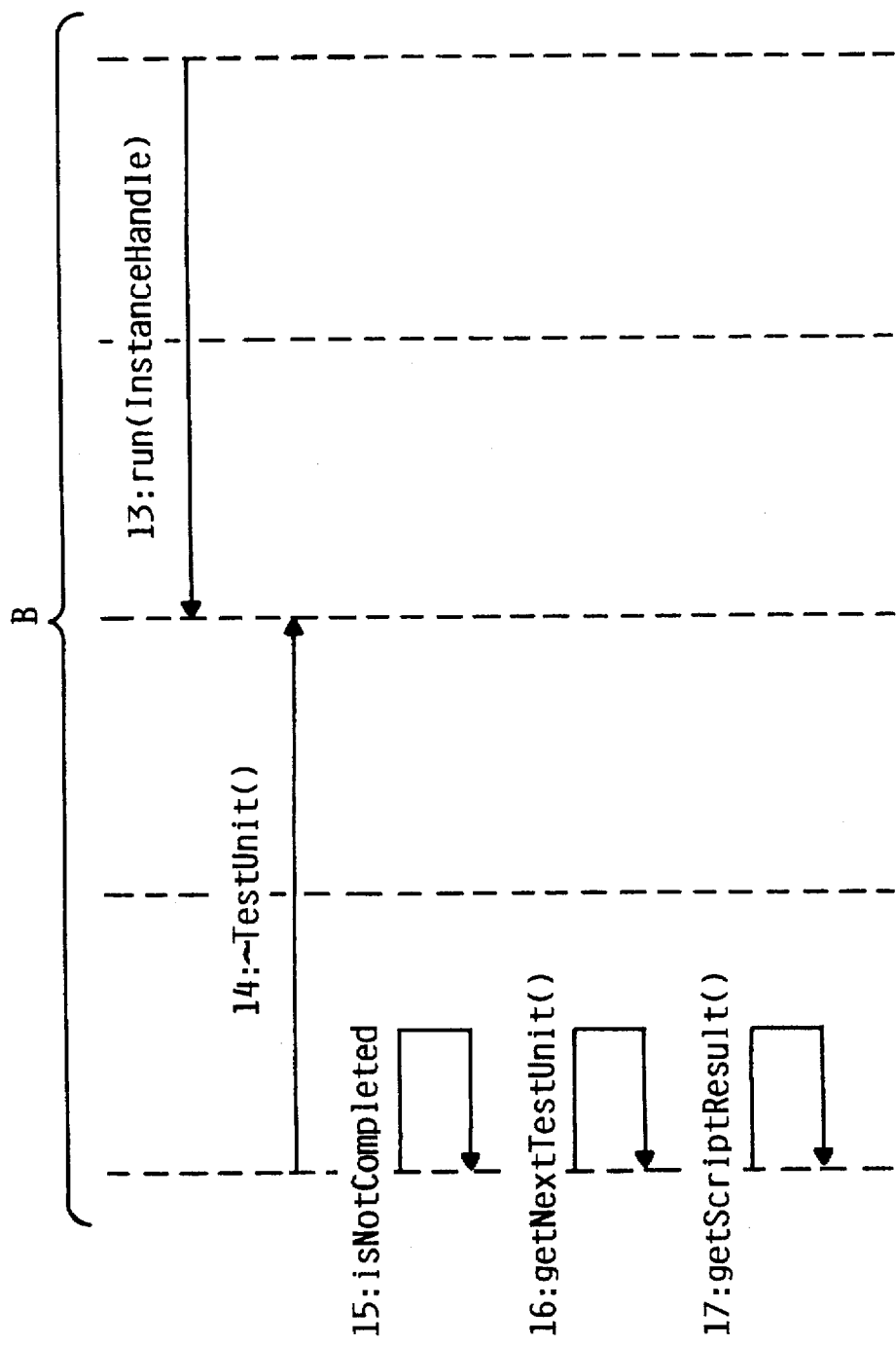

The operation of the example diagnostic application of FIG. 16 may be best understood in reference to the object diagrams of FIGS. 17–22. Referring to FIGS. 17 and 18, the object diagrams for the run( ) method within a DiagScript object is shown. Each of the objects shown correspond to classes defined and discussed above, i.e., object aDiagScript corresponds to an object instantiated under the DiagScript class; aDiagUI corresponds to an object instantiated under the UserInterface class; aResource corresponds to an object instantiated under the ResourceInstance class; aPolicy corresponds to an object instantiated under the Policy class; and aTestUnit corresponds to an object instantiated under the TestUnit class. This first test unit is passed to aPolicy via the validate( ) method (step 2). aPolicy then calls the getAttributes( ) method on aTestUnit (step 3), which returns an attribute list for the indicated test unit. aPolicy responds by calling its givesConsentTo( ) method. VoidTest( ) is then called (step 5) by aPolicy if any of the attributes returned conflict with the application's environmental constraints. If the attribute list in step 4 allows the test represented by aTestUnit to be performed, aDiagScript then calls method displayTestDataFor(TestUnit*) (step 6). If aTestUnit isNotVoid( ) due to policy reasons (step 7), aPolicy calls getAttributes( ) (step 8) and passes the attribute list to the displayTestData( ) method (step 9). Assuming the attribute list does not present any problems to running aTestUnit, aDiagScript then calls test(TestUnit*) on aResource (step 10). aResource then verifies that aTestUnit may still be performed (i.e., has not been voided by aPolicy) by invoking the isNotVoid( ) method (step 11). Assuming isNotVoid( ) returns true, getInstanceHandle( ) is called to return a unique identifier (i.e., instance handle) corresponding to the particular instance of aTestUnit that is instantiated (step 12). Next the method run( ) on aTestUnit is called (step 13), which causes the actual test contained in aTestUnit to be performed. Next, aDiagScript deletes aTestUnit (step 14), and checks to see if all the tests associated with aTestUnit have been completed by calling isNotCompleted(TUResult) (step 15). The DiagScript continues looping through this process by invoking the getNextTestUnit( ) (step 16) method and following the process described above until the isNotCompleted( ) (step 15) method returns a false value. Once the isNotCompleted( ) (step 15) method returns a false value, the loop is exited and the getScriptResult( ) (step 17) method is invoked to obtain the results of the diagnostic.

Figure 19:
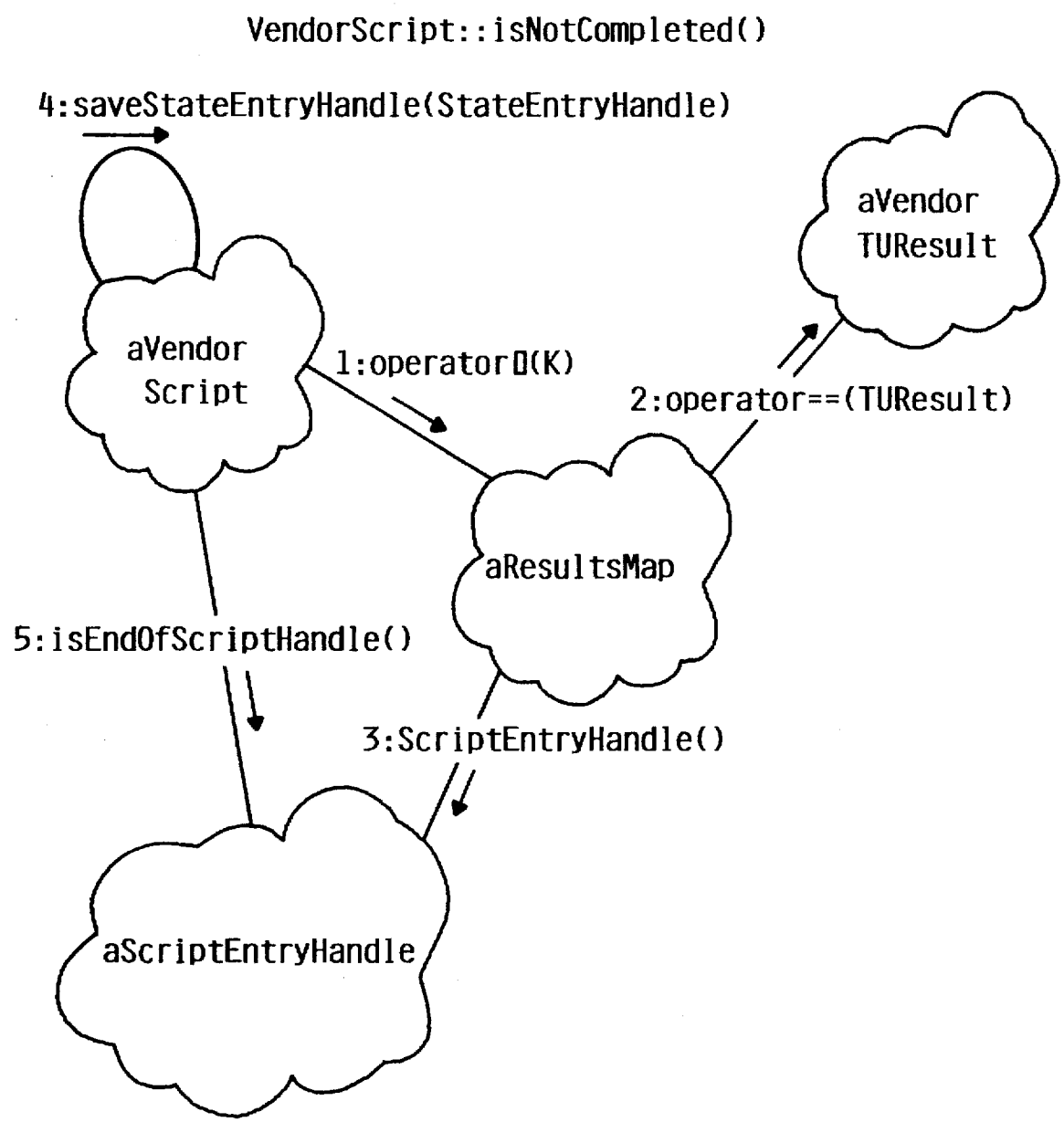

FIG. 19 illustrates an example of how a vendor might implement the isNotCompleted( ) method of a DiagScript subclass, VendorScript. The object aVendorScript first passes a TUResult to aResultsMap as an argument on the operator[ ](K) method (step 1). aResultsMap then compares the TUResult passed to it in step 1 with each predefined TUResult in its list via the operator==( ) method(step 2). If a match is found, aResultsMap creates and returns aScriptEntryHandle (step 3) to aVendorScript. Next, the saveStateEntryHandle( ) method is invoked (step 4), passing as a parameter the StateEntryHandle corresponding to the ScriptEntryHandle just passed in step 3. The final operation (step 5) is to call isEndOfScriptHandle( ) to determine if the current script handle is the last script handle to be processed. If isEndOfScriptHandle( ) returns a true (indicating that this script entry is the last), the isNotCompleted( ) method for aVendorScript returns true, thereby indicating that the vendor script has been processed.

Figure 20:
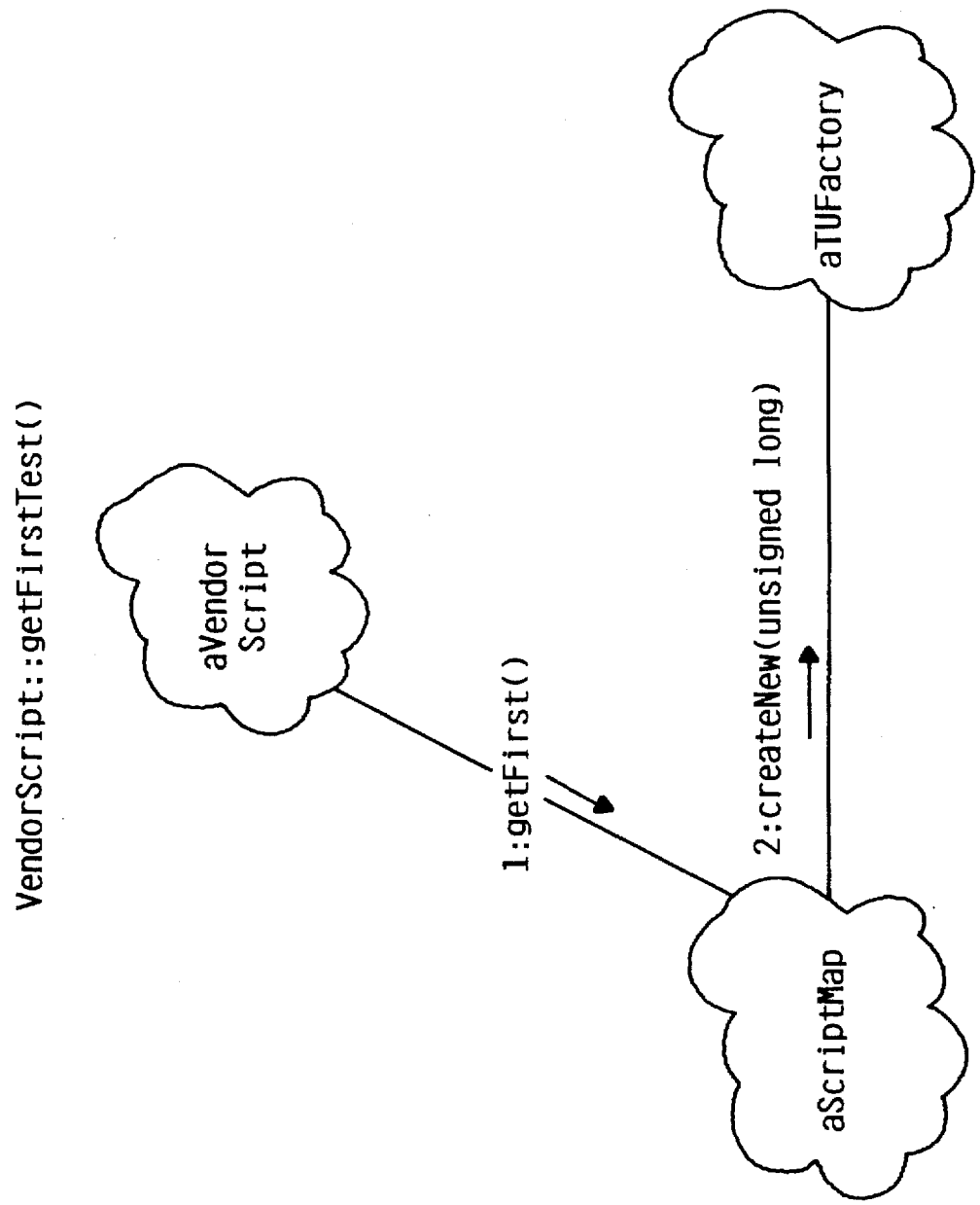

Next we consider the details of one specific implementation of the getFirstTest( ) method in the VendorScript class, as illustrated in FIG. 20. When aVendorScript object determines that the first test unit is needed, the getFirst( ) method on aScriptMap is invoked (step 1). aScriptMap determines which test unit corresponds to the first test unit that is needed, and passes an identifier for this test unit (in the form of an unsigned long integer) as a parameter when calling the createNew(unsigned long) method of aTUFactory (step 2). In response to calling the createNew( ) method with an unsigned long integer that identifies the first test unit, aTUFactory instantiates the first test unit, populates it with the appropriate attributes, and passes the test unit back to the framework.

Figure 21:
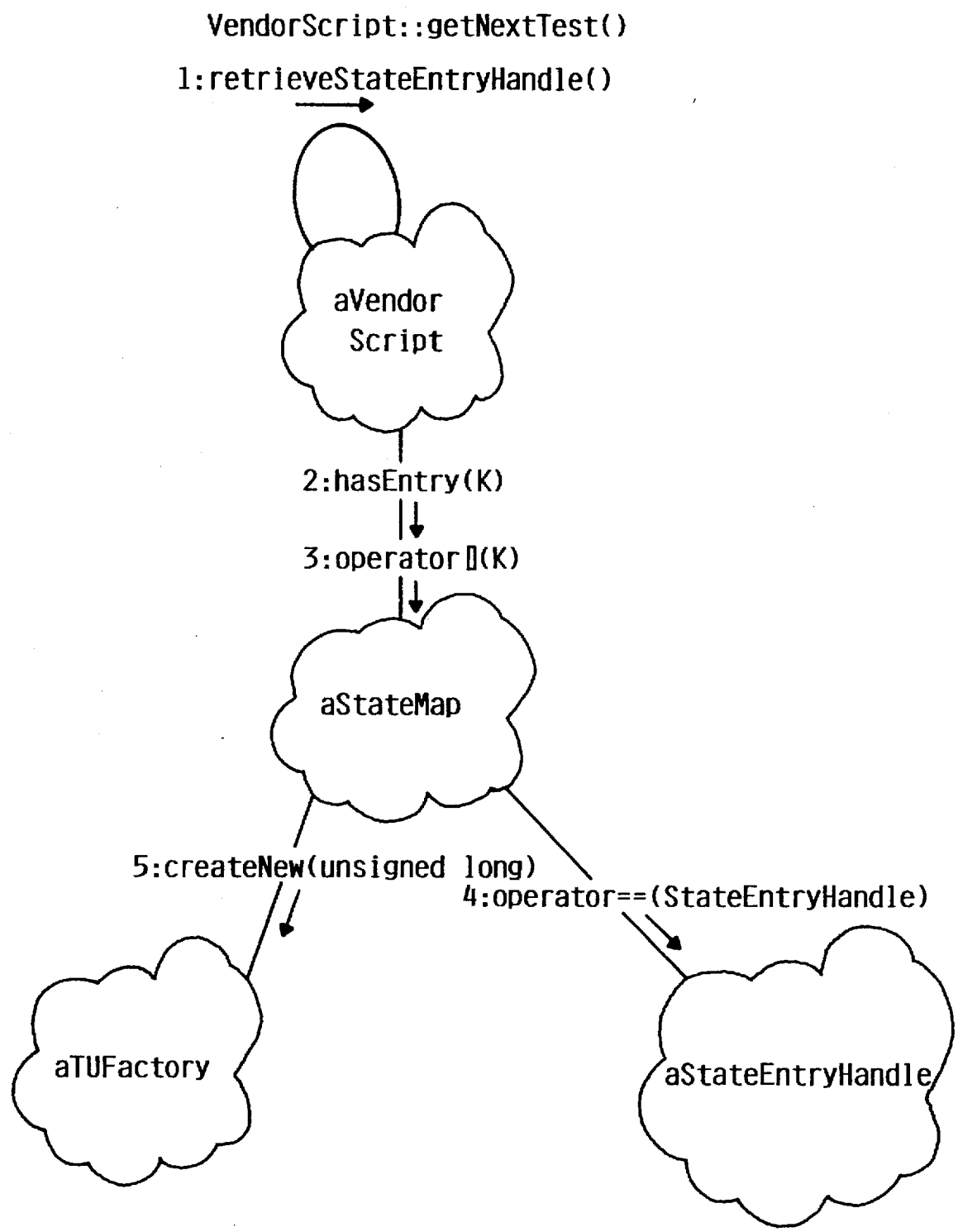

FIG. 21 continues this example by illustrating the implementation of the getNextTest( ) method within the VendorScript class. From the previous invocation of isNotCompleted( ) where the current state was saved via the saveStateEntryHandle( ) method, this state is retrieved via the retrieveStateEntryHandle( ) method(step 1). This StateEntryHandle is used to determine which TestUnit should be created. aVendorScript then calls the hasEntry(K) method on the aStateMap object (step 2), and calls operator[ ](K) (step 3) to search for an entry in aStateMap that matches the StateEntryHandle. Next, method operator== (StateEntryHandle) is called to determine which test unit corresponds to this particular stateEntryHandle (or identifier). An unsigned long integer corresponding to the test unit that is needed is then passed to the createNew (unsigned long) method of aTUFactory, which then instantiates the appropriate test unit, populates it with the attributes for the particular test unit, and passes the test unit back to the framework.

Figure 22:
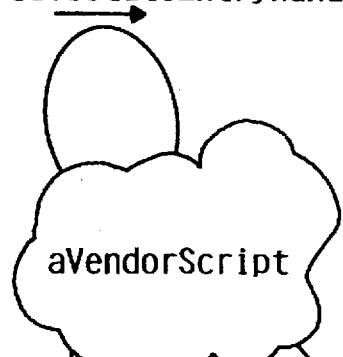

The details of the getScriptResult( ) method in the VendorScript class are illustrated in FIG. 22. The first step in obtaining the script result is to call the retrieveStateEntryHandle( ) method (step 1). Next, the hasEntry(K) method is invoked (step 2) to determine if any service actions exist for the test that was last completed. If an entry does exist, the operator[ ](K) method is invoked (step 3), which causes the aServiceMap object to scan its service map to determine if it has a service action corresponding to the particular StateEntryHandle. If so, the appropriate service action is passed to aScriptResults via the setServiceAction(ServiceAction*) method, which determines which service action is appropriate for the test unit and results just obtained.

The embodiments and examples set forth herein were presented in order to best explain the present invention and its practical application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit and scope of the forthcoming claims.

Notation

There is, as yet, no uniformly accepted notation for communicating object-oriented programming ideas. The notation used in this specification is very similar to that known in the programming industry as Booch notation, after Grady Booch. Mr. Booch is the author of *Object-Oriented Analysis and Design With Applications*, 2nd ed. (1994), available from The Benjamin/Cummings Publishing Company, Inc. Use of Booch notation concepts within this specification should not be taken to imply any connection between the inventors and/or the assignee of this patent application and Mr. Booch or Mr. Booch's employer. The notational system used by Mr. Booch is more fully explained at Chapter 5, pp. 171–228 of the aforementioned book. The notational system used herein will be explained generally below. Other notational conventions used herein will be explained as needed.

A system that is modeled by an object-oriented framework can be represented at a high level of abstraction by a diagram called a top-level class diagram. FIG. 1 of the drawings is an example of a top-level class diagram containing boxes that represent abstractions of the modeled system. The boxes are arranged in a hierarchy such that boxes representing abstractions close to the physical components of the system are at the lower levels of the diagram and boxes representing more abstract, functional components are closer to the top of the diagram. In FIG. 1, the boxes are labeled as "mechanisms" to denote that the abstractions comprise means for implementing modeled system components. The boxes (mechanisms) can be thought of as categories comprising groups of similar classes defined according to object-oriented programming concepts. FIG. 1 represents a zoo administration model and therefore the lower hierarchy boxes include a box called Animal Mechanism, which represents animals within the zoo model, and a box called Containment Unit Mechanism, which represents animal pens and cages. At the highest level of FIG. 1, the box called Zoo Administration represents a functional abstraction that encompasses a variety of administrative tasks that are performed by personnel.

The boxes in a top-level class diagram represent the system abstractions that provide the system behavior. The system abstractions include classes and objects. Details of the system classes are provided in a class diagram that is used to show the class categories and to indicate the relationships and responsibilities of the classes. A class is represented by an irregularly shaped, dashed-line icon commonly referred to a cloud. FIG. 2, for example, shows several classes represented as clouds. Each class is identified by a name that is unique to the associated class category and also indicates the relationship of each class to one of the mechanisms illustrated in FIG. 1. Within a class icon, the class name is listed above attribute names, operation names followed by parentheses, and constraints that are enclosed within brackets. FIG. 3 illustrates the class Zoo Administrator in greater detail. FIG. 3 indicates that the Zoo Administrator class includes multiple operations, including ones called "5_minute_timer( )", "add_animal( )", and "add_containment_unit( )". Words in the operation names (and class attribute names) are separated by an underscore for easier reading. An example of a class attribute listing is shown by the attributes called "feed_freq" and "temp_range" in the class Animals illustrated in FIG. 5.

Connecting lines between mechanisms (FIG. 1) and classes (FIG. 2) indicate the nature of the relationships between such respective abstractions. Thus, connections between the boxes in FIG. 1 represent relationships between the various mechanisms. A straight connecting line, for example, represents a simple association relationship indicating shared information. A "using" relationship is a refinement of a simple association whereby one abstraction that is referred to as a server or supplier provides services to another abstraction that is referred to as a client. Such a relationship is indicated by an open circle at one end of a simple association line, the open circle end designating the client that "uses" the associated server.

Another refinement of a simple association between two classes is a type referred to as an inheritance relationship. Inheritance is a relationship among classes in which one class shares the structure and/or behavior associated with one or more other classes. An inheritance association is also referred to as a "is a" relationship. Thus, given two classes A and B, the class A has an inheritance relationship with the class B if A is an example of a B; A is said to be a subclass of B and B is said to be a superclass or parent of A. That is, A "is a" B. An inheritance relationship is denoted with a connecting line that includes an arrowhead at one end to indicate a subclass that derives its characteristics from a parent class at the other end of the line.

Another refinement of class relationships is called an aggregation relationship, which denotes an association between a whole and its parts or attribute classes. In notation, an aggregation relationship is indicated between a whole class and an attribute class connected with an association line by a solid circle at the whole class end, with an attribute class at the other end.

Another relationship specified by a class diagram is an instantiation relationship. An instantiation relationship represents an instance of a class such as a particular implementation of a class as supported by a programming language. For example, a class called "animal" can have multiple instantiations comprising lions, tigers, and bears. An instantiation of a class is represented by a dashed association line with an arrowhead pointing from an instance of a class to the general class.

Finally, a class relationship referred to as a metaclass denotes a relationship in which a class itself is treated as an object that can be manipulated. That is, a metaclass is a class whose instances are themselves classes. Some computer languages, such as Small Talk, support the concept of a metaclass. Such relationships are denoted by a shaded line with an arrowhead pointing from an instance of a metaclass to the general metaclass.

Classes can be parameterized, which denotes a family of classes whose structure and behavior are defined independently of its formal class parameters. A parameterized class is represented by a cloud-shaped class icon with a rectangular box placed over a portion of the cloud. The parameter list is named within the rectangular box. An instantiated class includes a parameter box, called an adornment, in contrast to a dashed line box for a general class. The instantiation relationship between a parameterized class and its instantiated class is represented as a dashed line pointing to the parameterized class. Typically, an instantiated class requires a "using" relationship to another concrete class for use as an actual parameter.

Properties of classes can be represented by class adornments that are enclosed within the class cloud icon. In particular, an abstract class is denoted by an upper case block "A" within a triangle that is placed within a cloud. An abstract class is a class for which no instances may be created. That is, it is a class of classes. Other class adornments are functions of the OO implementation language. For example, the C++ language permits special class qualifications that will be given special adornments. A static class is represented by an upper case block "S" within an adornment triangle, a friend class is denoted by an upper case block "F" within an adornment triangle, and a virtual class is represented by an upper case block "V" within an adornment triangle.

In addition to defining classes, a designer of an object oriented programming system must define objects (see page 136 of Booch). Objects are represented as solid line clouds within which is placed the object name located above a list of object attributes. An object is a tangible entity that exhibits a well defined behavior. An object is intended to represent some part of a real system that is being represented by the object oriented program. An object is characterized by a state, a behavior, and an identity. An object can be thought of as an instance of a class. The behavior of an object is an indication of how the object acts and reacts in terms of its state changes and its message-passing actions.

Objects and their interrelationships are represented in object diagrams that comprise object icons having links that indicate synchronization between objects. Links are sequentially numbered to indicate the flow of operations. The existence of a link between two objects indicates an association between their corresponding classes and denotes a path of communication between them. Thus, a link between two objects indicates that one object may send messages to another. The direction of message transfer is indicated by adorning a simple connecting line with an arrowhead that points from an object that invokes an operation, referred to as the client, to the object that provides the operation, referred to as the supplier. Such a representation of a simple synchronization relationship denotes the simplest form of message-passing. Such an association can indicate, for example, the invocation of an operation. Operation parameters can be indicated adjacent the linking line.

Some objects may be active, meaning that they embody their own thread of control. That is, such objects are not simply sequential. Active objects may have a variety of concurrency characteristics. If an object has multiple threads of control, then synchronization must be specified. Message synchronization can be synchronous, meaning that the client will wait until the supplier accepts the message. Synchronous synchronization is indicated with an "X" with an arrowhead. Synchronization can encompass balking message-passing, meaning that the client will abandon the message if the supplier cannot immediately service the message. Balking is indicated with an arrowhead turned back on itself. Synchronization can encompass a time-out synchronization, meaning that the client will abandon the message if the supplier cannot service the message within a specified amount of time. Time-out synchronization is indicated with a clock face representation adjacent a linking arrowhead. Finally, synchronization can encompass an asynchronous message, meaning that the client sends an event to a supplier for processing, the supplier queues the message, and the client then proceeds without waiting for the supplier. Those skilled in the art will appreciate that asynchronous message synchronization is analogous to interrupt handling. Asynchronous message synchronization is indicated with a half arrowhead.

It bears mention that the Booch notation includes interaction diagrams that trace the execution of objects and classes. Interaction diagrams are essentially restructured object diagrams. That is, interaction diagrams do not convey any additional information from that conveyed by object diagrams, but simply present the same information in a different format. The present specification makes use of object diagrams rather than interaction diagrams, but those skilled in the art will recognize that they are equivalent and also will understand how to convert from one to the other without further explanation.

In FIG. 7, for example, the object called Zelda 706 obtains a list of current zoo keepers by calling an operation called List Zoo Keepers from the object called Zoo Keeper Register. The second processing step is represented in FIG. 7 by the Zoo Keeper Register object responding to the operation call by passing a message to the Zelda object that comprises the zoo keeper list. The zoo keeper objects include members of the Zoo Keepers class called Tina, Vince, and Fred. The third step indicated in the object diagram is for the object Zelda to pass a message to each of the zoo keepers instructing them to check the animals by calling the respective Check Animals operation of each zoo keeper object.

What is claimed is:

1. A computer system, the computer system comprising:
    a central processing unit; and
    a main memory coupled to the central processing unit, the main memory containing a framework that provides an extensible diagnostic processing system that performs diagnostic testing according to a diagnostic script, the framework executing on the central processing unit, the framework including a first level of extensibility to define a diagnostic application and a second level of extensibility to define at least one test that the diagnostic application executes.

2. The computer system of claim 1 wherein the framework defines a diagnostic script class comprising:
    at least one diagnostic script object that defines the information contained in the diagnostic script; and
    a first set of object methods to process a plurality of test units and to determine when the last of the plurality of test units has been processed.

3. The computer system of claim 2 wherein the diagnostic script determines the order of processing the plurality of test units.

4. The computer system of claim 3 wherein the diagnostic script determines the order of processing the plurality of test units by identifying a next test unit to process depending on the results of processing the previous test unit.

5. The computer system of claim 2 wherein the framework further defines a resource instance class, a user interface class, and a policy class, and wherein the diagnostic script class has a using relationship with each of the resource instance class, the user interface class, and the policy class.

6. The computer system of claim 5 wherein the diagnostic script class, the resource class, the user interface class, and the policy class are user-extensible classes of the framework, the implementation of which by a user defines the diagnostic script.

7. The computer system of claim 2 wherein the first set of object methods include at least one method that retrieves a test unit.

8. The computer system of claim 1 wherein the framework defines a test unit class comprising:
    at least one test unit object that defines at least one of a plurality of tests to be performed when the diagnostic script is processed; and
    a second set of object methods to perform at least one of the plurality of tests.

9. The computer system of claim 8 wherein the framework further defines an attribute class, a list class, and an attribute list class, the attribute class and the list class defining the characteristics of the attribute list class.

10. The computer system of claim 9 wherein the test unit class and the attribute class are user-extensible classes of the framework, the implementation of which by a user defines at least one of the plurality of tests that is performed during processing of the diagnostic script, and the attributes of the at least one test.

11. The computer system of claim 9 wherein the list class and the attribute list class are core classes of the framework that are defined by the framework and cannot be modified by the user of the framework.

12. The computer system of claim 8 wherein the second set of object methods include methods that retrieve attributes of a selected test unit and that run the at least one test associated with the selected test unit.

13. The computer system of claim 1 wherein the framework defines a result class comprising:
    at least one result object that contains the results of processing at least one of a plurality of tests; and
    a third set of object methods to determine the results of processing the at least one test.

14. The computer system of claim 13 wherein the framework further defines a test unit result class, a script result class, and a service action class, the test unit result class and the script result class being subclasses of the result class.

15. The computer system of claim 14 wherein the test unit result class and the service action class are user-extensible classes of the framework, the implementation of which by a user defines the conditions that determine when an error is returned when at least one of the plurality of tests is processed and what service action, if any, is needed based on the error.

16. The computer system of claim 14 wherein the result class and the script result class are core classes of the framework that are defined by the framework and cannot be modified by the user of the framework.

17. The computer system of claim 13 wherein the third set of object methods include at least one method that returns the results of processing a selected test.

18. The computer system of claim 17 wherein the third set of object methods further include at least one method that performs a predetermined service action in response to at least one of the result objects containing a predetermined result after performing the selected test.

19. The computer system of claim 1 wherein the framework comprises:
    at least one diagnostic script object that defines the information contained in the diagnostic script, the diagnostic script object including a first set of object methods to process a plurality of test units and to determine when the last of the plurality of test units has been processed;
    at least one test unit object that defines at least one of a plurality of tests that are performed when the diagnostic script is processed, the test unit object including a second set of object methods to perform at least one of the plurality of tests; and
    at least one result object that contains the results of processing at least one of the plurality of tests, the result object including a third set of object methods to determine the results of processing the at least one test.

20. The computer system of claim 1 wherein the main memory contains an operating system that supports an object oriented programming environment containing the framework, and wherein the diagnostic script is provided from a source external to the operating system.

21. The computer system of claim 1 wherein the framework comprises:
   core functions defined by at least one core class, wherein the implementation of the core functions is defined by the framework and cannot be modified by a user of the framework; and
   extensible functions defined by at least one extensible class, wherein the implementation of the extensible functions is defined by the user of the framework by extending the at least one extensible class.

22. The computer system of claim 1 wherein the diagnostic script comprises information that allows the central processing unit to perform a plurality of tests on a targeted product.

23. A method for performing diagnostic testing of a targeted product, the method comprising the steps of:
   providing an extensible object oriented framework mechanism that performs at least one test according to a diagnostic script customized to test the targeted product, the framework mechanism including a first level of extensibility to define a diagnostic application and a second level of extensibility to define the at least one test that the diagnostic application executes; and
   executing the object oriented framework mechanism on a computer system in accordance with the diagnostic script.

24. The method of claim 23 further including the step of:
   extending the framework mechanism to define the diagnostic script, the diagnostic script processing a plurality of test units.

25. The method of claim 24 further including the step of:
   determining the order of processing the plurality of test units by identifying a next test unit to process depending on the results of processing the previous test unit.

26. The method of claim 24 further including the steps of:
   providing a last test unit indicator to signal when at least one of the plurality of test units are processed; and
   halting the processing of the plurality of test units when the last test indicator signals the processing of the at least one test unit.

27. The method of claim 23 further including the step of:
   providing an output indicating the results of each test performed when the computer system executes the framework mechanism in accordance with the diagnostic script.

28. The method of claim 23 further including the steps of:
   coupling the targeted product to the computer system;
   defining a plurality of policy considerations corresponding to each test;
   determining whether each test should be performed based on the plurality of policy considerations; and
   performing only those tests for which the corresponding policy considerations allow.

29. A program product comprising:
   a framework mechanism for diagnostic testing, the framework mechanism including an extensible diagnostic processing system that performs diagnostic testing according to a diagnostic script, the framework mechanism including a first level of extensibility to define a diagnostic application and a second level of extensibility to define the at least one test that the diagnostic application executes; and
   computer-readable signal bearing media bearing the framework mechanism.

30. The program product of claim 29 wherein the signal bearing media comprises recordable media.

31. The program product of claim 29 wherein the signal bearing media comprises transmission media.

32. The program product of claim 29 wherein the diagnostic script processes a plurality of tests.

33. The program product of claim 32 wherein the diagnostic script determines the order of processing the plurality of tests.

34. The program product of claim 33 wherein the diagnostic script determines the order of processing the plurality of tests by identifying a next test to process depending on the results of processing the previous test.

35. An object oriented framework mechanism for use in a computer system having an operating system that supports an object oriented programming environment, the framework mechanism comprising:
   a first level of extensibility to define a diagnostic application;
   a second level of extensibility to define a plurality of tests that the diagnostic application executes;
   at least one diagnostic script object that defines the information contained in a diagnostic script, the diagnostic script object including a first set of object methods to process a plurality of test units corresponding to the plurality of tests and to determine when the last of the plurality of test units has been processed;
   at least one test unit object that defines at least one of the plurality of tests that are performed when the diagnostic script is processed, the test unit object including a second set of object methods to perform at least one of the plurality of tests; and
   at least one result object that contains the results of processing at least one of the plurality of tests, the result object including a third set of object methods to determine the results of processing the at least one test.

36. The framework mechanism of claim 35 wherein the framework mechanism further defines a resource instance class, a user interface class, and a policy class, and wherein the diagnostic script class has a using relationship with each of the resource instance class, the user interface class, and the policy class.

37. The framework mechanism of claim 35 wherein the first set of object methods include at least one method that retrieves a test unit.

38. The framework mechanism of claim 35 wherein the second set of object methods include methods that retrieve attributes of a selected test unit and that run the at least one test associated with the selected test unit.

39. The framework mechanism of claim 35 wherein the third set of object methods include at least one method that returns the results of processing a selected test.

40. The framework mechanism of claim 39 wherein the third set of object methods further include at least one method that performs a predetermined service action in response to at least one of the result objects containing a predetermined result after performing the selected test unit.

41. The framework mechanism of claim 35 wherein the diagnostic script is provided from a source external to the operating system.

42. The framework mechanism of claim 35 wherein the framework comprises:
   core functions defined by at least one core class, wherein the implementation of the core functions is defined by the framework and cannot be modified by a user of the framework; and extensible functions defined by at least one extensible class, wherein the implementation of the extensible functions is defined by the user of the framework by extending the at least one extensible class.

43. The framework mechanism of claim 35 wherein the diagnostic script comprises information that allows the framework mechanism to perform a plurality of diagnostic functions on a targeted product.

44. A method for performing diagnostic testing of a targeted product, the method comprising the steps of:
   (A) providing a framework mechanism, the framework mechanism including a first level of extensibility to define a diagnostic application and a second level of extensibility to define a plurality of tests that the diagnostic application executes:
   (B) providing at least one diagnostic script object that defines the information contained in a diagnostic script, the diagnostic script object including a first set of object methods to process a plurality of test units corresponding to the plurality of tests and to determine when the last of the plurality of test units has been processed;
   (C) providing at least one test unit object that defines at least one of a plurality of tests that are performed when the diagnostic script is processed, the test unit object including a second set of object methods to perform at least one of the plurality of tests;
   (D) providing at least one result object that contains the results of processing at least one of the plurality of tests, the result object including a third set of object methods to determine the results of processing the at least one test;
   (E) providing an object oriented framework mechanism that comprises the at least one diagnostic script object, the at least one test unit object, and the at least one result object, and wherein the object oriented framework mechanism performs at least one diagnostic test according to the diagnostic script;
   (F) executing the object oriented framework mechanism on a computer system in accordance with the diagnostic script to test the targeted product.

45. The method of claim 44 further including the step of:
   extending the framework mechanism to define the diagnostic script, the diagnostic script processing a plurality of tests.

46. The method of claim 45 further including the step of:
   determining the order of processing the plurality of tests by identifying a next test to process depending on the results of processing the previous test.

47. The method of claim 45 further including the steps of:
   providing a last test unit indicator to signal when at least one of the plurality of tests are processed; and
   halting the processing of the plurality of tests when the last test indicator signals the processing of the at least one test.

48. The method of claim 44 further including the step of:
   providing an output indicating the results of each test performed when the computer system executes the framework mechanism in accordance with the diagnostic script.

49. The method of claim 44 further including the steps of:
   coupling the targeted product to the computer system;
   defining a plurality of policy considerations corresponding to each test;
   determining whether each test should be performed based on the plurality of policy considerations; and
   performing only those tests for which the corresponding policy considerations allow.

50. A program product comprising:
   (A) an object oriented framework mechanism for diagnostic testing, the framework mechanism including a first level of extensibility to define a diagnostic application, a second level of extensibility to define a plurality of tests that the diagnostic application executes, at least one diagnostic script object that defines the information contained in a diagnostic script, the diagnostic script object including a first set of object methods to process a plurality of test units corresponding to the plurality of tests and to determine when the last of the plurality of test units has been processed, the framework mechanism further including at least one test unit object that defines at least one of a plurality of tests to be performed when the diagnostic script is processed, the test unit object including a second set of object methods to perform at least one of the plurality of tests, the framework mechanism further including at least one result object that contains the results of processing at least one of the plurality of tests, the result object including a third set of object methods to determine the results of processing the at least one test; and
   (B) computer-readable signal bearing media bearing the object oriented framework mechanism.

51. The program product of claim 50 wherein the signal bearing media comprises recordable media.

52. The program product of claim 50 wherein the signal bearing media comprises transmission media.

53. The program product of claim 50 wherein the diagnostic script processes a plurality of tests.

54. The program product of claim 53 wherein the diagnostic script determines the order of processing the plurality of tests.

55. The program product of claim 54 wherein the diagnostic script determines the order of processing the plurality of test units by identifying a next test unit to process depending on the results of processing the previous test unit.

56. An object oriented framework mechanism that performs at least one diagnostic test according to a diagnostic script, the framework mechanism comprising:
   at least one core class wherein the implementation of the core class is defined by the framework and cannot be modified by a user of the framework; and
   at least one extensible class wherein the implementation of the extensible class is defined by the user of the framework, by extending the at least one extensible class, thereby defining the diagnostic script.

57. The object oriented framework mechanism of claim 56 further comprising:
   at least one diagnostic script object that defines the information contained in a diagnostic script, the diagnostic script object including a first set of object methods to process a plurality of test units and to determine when the last of the plurality of test units has been processed;
   at least one test unit object that defines at least one of the plurality of tests to be performed when the diagnostic script is processed, the test unit object including a second set of object methods to perform at least one of the plurality of tests; and
   at least one result object that contains the results of processing at least one of the plurality of tests, the result object including a third set of object methods to determine the results of processing the at least one test.

58. The object oriented framework mechanism of claim 57 wherein the framework mechanism further defines a resource instance class, a user interface class, and a policy class, and wherein the diagnostic script class has a using relationship with each of the resource instance class, the user interface class, and the policy class.

59. The object oriented framework mechanism of claim 57 wherein the first set of object methods include at least one method that retrieves a test unit.

60. The object oriented framework mechanism of claim 57 wherein the second set of object methods include methods that retrieve attributes of a selected test unit and that run the at least one test associated with the selected test unit.

61. The object oriented framework mechanism of claim 57 wherein the third set of object methods include at least one method that returns the results of processing a selected test.

62. The object oriented framework mechanism of claim 61 wherein the third set of object methods further include at least one method that performs a predetermined service action in response to at least one of the result objects containing a predetermined result after processing the selected test.

63. A method for performing diagnostic testing of a targeted product using a computer system having a central processing unit and a main memory, the main memory having an operating system that supports an object oriented programming environment, the method comprising the steps of:

(A) providing in the operating system an object oriented framework mechanism that performs at least one test according to a diagnostic script, the framework mechanism including:
  a set of core functions wherein the implementation of the core functions is defined by the framework and cannot be modified by a user of the framework mechanism; and
  a set of extensible functions wherein the implementation of the extensible functions is defined by the user of the framework mechanism;

(B) extending the extensible functions in the framework mechanism to define particular diagnostic script objects having predetermined protocols and defining particular object methods that perform the at least one test, the extensible functions defining the diagnostic script;

(C) generating an executable diagnostic system by integrating together the extensible functions and the core functions; and (D) executing the executable diagnostic system on the computer system to perform the testing of the targeted product.

64. The method of claim 63 further including the step of: determining the order of processing the plurality of test units by identifying a next test unit to process depending on the results of processing the previous test unit.

65. The method of claim 63 further including the steps of:
providing a last test unit indicator to signal when at least one of the plurality of test units are processed; and
halting the processing of the plurality of test units when the last test indicator signals the processing of the at least one test unit.

66. The method of claim 63 further including the step of:
providing an output indicating the results of each test performed when the computer system executes the framework mechanism in accordance with the diagnostic script.

67. The method of claim 63 further including the steps of:
coupling the targeted product to the computer system;
defining a plurality of policy considerations corresponding to each test;
determining whether each test should be performed based on the plurality of policy considerations; and
performing each test only if the corresponding policy considerations allow.

68. A program product comprising:
an object oriented framework mechanism for diagnostic testing, the framework mechanism including at least one core class wherein the implementation of the core class is defined by the framework and cannot be modified by a user of the framework, the framework mechanism further including at least one extensible class wherein the implementation of the extensible class is defined by the user of the framework by extending the at least one extensible class, thereby defining a diagnostic script that governs the operation of the framework mechanism; and
computer-readable signal bearing media bearing the object oriented framework mechanism.

69. The program product of claim 68 wherein the signal bearing media comprises recordable media.

70. The program product of claim 68 wherein the signal bearing media comprises transmission media.

71. The program product of claim 68 wherein the diagnostic script processes a plurality of tests defined by a plurality of test units, and wherein the diagnostic script determines the order of processing the plurality of test units by identifying a next test unit to process depending on the results of processing the previous test unit.

72. The program product of claim 71 wherein the framework comprises:
at least one extensible diagnostic script class, the implementation of which by a user defines the diagnostic script, the diagnostic script class defining a first set of object methods to process the plurality of test units, to determine when the last of the plurality of test units has been processed, and to retrieve a test unit;
at least one extensible test unit class, the implementation of which by a user defines at least one of the plurality of tests that are performed when the diagnostic script is processed, the test unit class defining a second set of object methods to perform at least one of the plurality of tests, to retrieve attributes of a selected test unit, and to run the at least one test associated with the selected test unit;
at least one extensible result class that contains the results of processing at least one of the plurality of tests, the result class defining a third set of object methods to determine the results of processing the at least one test, to return the results of processing the at least one test, and to perform a predetermined service action in response to at least one of the result objects containing a predetermined result after performing the at least one test.

* * * * *